(12) United States Patent
Brubaker

(10) Patent No.: US 12,017,828 B2
(45) Date of Patent: Jun. 25, 2024

(54) BARREL LID FOR FACILITATING VENTILATING OF A BARREL

(71) Applicant: Brian Joseph Brubaker, Monrovia, CA (US)

(72) Inventor: Brian Joseph Brubaker, Monrovia, CA (US)

( * ) Notice: Subject to any disclaimer, the term of this patent is extended or adjusted under 35 U.S.C. 154(b) by 549 days.

(21) Appl. No.: 17/180,716

(22) Filed: Feb. 19, 2021

(65) Prior Publication Data

US 2021/0253317 A1   Aug. 19, 2021

Related U.S. Application Data

(60) Provisional application No. 62/978,724, filed on Feb. 19, 2020.

(51) Int. Cl.
| | |
|---|---|
| *B65D 51/16* | (2006.01) |
| *A23L 3/00* | (2006.01) |
| *F26B 9/06* | (2006.01) |
| *F26B 21/08* | (2006.01) |
| *F26B 21/10* | (2006.01) |
| *G05D 7/06* | (2006.01) |

(52) U.S. Cl.
CPC .......... *B65D 51/1644* (2013.01); *A23L 3/001* (2013.01); *B65D 51/16* (2013.01); *F26B 9/06* (2013.01); *F26B 21/08* (2013.01); *F26B 21/10* (2013.01); *G05D 7/0688* (2013.01)

(58) Field of Classification Search
CPC . F26B 9/06; F26B 21/08; F26B 21/10; B65D 51/1644; B65D 51/16; A23L 3/001; G05D 7/0688
See application file for complete search history.

(56) References Cited

U.S. PATENT DOCUMENTS

| | | | |
|---|---|---|---|
| 5,262,578 | A | 11/1993 | Hall |
| 5,405,038 | A | 4/1995 | Chuang |
| 8,677,648 | B2 | 3/2014 | Schreiner |
| 10,021,838 | B1 | 7/2018 | Gustafik |

(Continued)

FOREIGN PATENT DOCUMENTS

| | | | | |
|---|---|---|---|---|
| WO | WO-9325321 | A1 * | 12/1993 | ........... B05B 11/047 |
| WO | WO-2008114998 | A1 * | 9/2008 | ........... G01N 33/491 |

OTHER PUBLICATIONS

Autocure, Auto Cure | Technology: How does Auto Cure work?, Dec. 13, 2019.

*Primary Examiner* — Jessica Yuen
(74) *Attorney, Agent, or Firm* — Philip T. Virga

(57) ABSTRACT

Disclosed herein is a barrel lid for facilitating ventilating of a barrel, in accordance with some embodiments. Further, the barrel lid comprises ports, pumps, a duct, and valves. Further, an inlet pump of the pumps is configured for drawing external air into an interior space of the barrel from an exterior space of the barrel through an inlet port of the ports and an outlet pump of the pumps is configured for expelling internal air from the interior space into the exterior space through an outlet port of the ports. Further, the duct is coupled with the inlet port. Further, openings of the duct are configured for creating airflows in the interior space for ventilating the interior space based on the drawing and the expelling. Further, the valves are configured for transitioning between an open state and a closed state for openably closing the ports.

1 Claim, 19 Drawing Sheets

(56) References Cited

U.S. PATENT DOCUMENTS

| | | |
|---|---|---|
| 10,422,579 B2 | 9/2019 | Kozlowski et al. |
| 11,340,016 B2 * | 5/2022 | O'Hare ................ F26B 21/004 |
| 2007/0003899 A1 | 1/2007 | Lipscomb et al. |
| 2007/0267090 A1 | 11/2007 | Jordan et al. |
| 2011/0095027 A1 | 4/2011 | Starr et al. |
| 2015/0096189 A1 | 4/2015 | Hawes et al. |

* cited by examiner

BARREL LID FOR FACILITATING VENTILATING OF A BARREL

The current application claims a priority to the U.S. provisional patent application Ser. No. 62/978,724 filed on Feb. 19, 2020.

FIELD OF THE INVENTION

Generally, the present disclosure relates to the field of bottles, jars, and barrels. More specifically, the present disclosure relates to a barrel lid for facilitating ventilating of a barrel.

BACKGROUND OF THE INVENTION

Existing barrel lids of a barrel for facilitating ventilating of the barrel are deficient with regard to several aspects. For instance, the existing barrel lids do not create airflows in the barrel for facilitating the ventilating. Furthermore, existing barrel lids do not control the airflows in the barrel. Moreover, existing barrel lids do not provide ducting for creating even airflows in the barrel. Further, the ventilating of the barrel facilitates curing of herbs, spices, botanical material, and/or cannabis/hemp disposed/contained in the barrel. Further, the herbs, spices, botanical material, and/or cannabis/hemp requires long-term storage and frequent burping/venting to increase flavor and potency. Properly cured herbs, spices, botanical material, and/or cannabis/hemp may be stored for up to six months in containers or long-term storage, it may be kept in vacuum-sealed storage for a year or more. Conventional techniques involve curing herbs, spices, botanical material, and/or cannabis/hemp manually for five minutes twice a day.

Therefore, there is a need for an improved barrel lid for facilitating ventilating of a barrel that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a barrel lid for facilitating ventilating of a barrel, in accordance with some embodiments. Further, the barrel lid may be configured to be coupled with an opening of the barrel. Further, the barrel may include an interior space. Further, the barrel lid may include at least two ports disposed on the barrel lid. Further, the at least two ports lead into the interior space from an exterior space outside of the barrel. Further, the barrel lid may include at least two pumps, at least one duct, and at least two valves. Further, the at least two pumps may be at least two fans. Further, the at least two pumps may be attached to the at least two ports. Further, the at least two pumps may include an inlet pump attached to an inlet port of the at least two ports and an outlet pump attached to an outlet port of the at least two ports. Further, the inlet pump may be configured for drawing external air into the interior space from the exterior space through the inlet port. Further, the outlet pump may be configured for expelling internal air from the interior space into the exterior space through the outlet port. Further, the at least one duct may be coupled with the inlet port. Further, the at least one duct may be configured to be disposed in the interior space of the barrel. Further, the at least one duct extends along a barrel length of the barrel. Further, the at least one duct may include a plurality of openings disposed along a length of the at least one duct from a top end of the at least one duct to a bottom end of the at least one duct. Further, the top end of the at least one duct may be fluidly coupled with the inlet port. Further, the plurality of openings of the at least one duct may be configured for creating a plurality of airflows in the interior space along the barrel length of the barrel for ventilating the interior space based on the drawing of the external air through the inlet port and the expelling of the internal air through the outlet port. Further, the at least two valves may be attached to the at least two ports. Further, the at least two valves may be configured for transitioning between an open state and a closed state for openably closing the at least two ports. Further, the at least two valves may be configured for opening the at least two ports based on the transitioning of the at least two valves from the closed state to the open state. Further, the opening of the at least two ports unseals the barrel. Further, the drawing of the external air through the inlet port and the expelling of the internal air through the outlet port may be based on the opening of the at least two ports.

Further disclosed herein is a barrel lid for facilitating ventilating of a barrel, in accordance with some embodiments. Further, the barrel lid may be configured to be coupled with an opening of the barrel. Further, the barrel may include an interior space. Further, the barrel lid may include at least two ports disposed on the barrel lid. Further, the at least two ports lead into the interior space from an exterior space outside of the barrel. Further, the barrel lid may include at least two pumps, at least one duct, at least two valves, a controller, and a memory device. Further, the at least two pumps may be at least two fans. Further, the at least two pumps may be attached to the at least two ports. Further, the at least two pumps may include an inlet pump attached to an inlet port of the at least two ports and an outlet pump attached to an outlet port of the at least two ports. Further, the inlet pump may be configured for drawing external air into the interior space from the exterior space through the inlet port. Further, the outlet pump may be configured for expelling internal air from the interior space into the exterior space through the outlet port. Further, the at least one duct may be coupled with the inlet port. Further, the at least one duct may be configured to be disposed in the interior space of the barrel. Further, the at least one duct extends along a barrel length of the barrel. Further, the at least one duct may include a plurality of openings disposed along a length of the at least one duct from a top end of the at least one duct to a bottom end of the at least one duct. Further, the top end of the at least one duct may be fluidly coupled with the inlet port. Further, the plurality of openings of the at least one duct may be configured for creating a plurality of airflows in the interior space along the barrel length of the barrel for ventilating the interior space based on the drawing of the external air through the inlet port and the expelling of the internal air through the outlet port. Further, the at least two valves may be attached to the at least two ports. Further, the at least two valves may be configured for transitioning between an open state and a closed state for openably closing the at least two ports. Further, the at least two valves may be configured for opening the at least two ports based on the transitioning of the at least two valves from the closed state to the open state. Further, the opening of the at least two ports unseals the barrel. Further, the drawing of the external air through the inlet port and the expelling of the internal air through the outlet port may be based on the opening of the at least two ports. Further, the controller may be communicatively coupled with the at least two pumps. Further, the controller may be configured for analyzing operational data associated with the at least two pumps. Further, the controller may be configured for determining at least one operating parameter associated with the at least two pumps based on the analyzing. Further, the controller may be configured for generating an operating command based on the determining. Further, the drawing of the external air through the inlet port and the expelling of the internal air through the outlet port may be based on the operating command. Further, the memory device may be communicatively coupled with the controller. Further, the memory device may be configured for storing the operational data.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
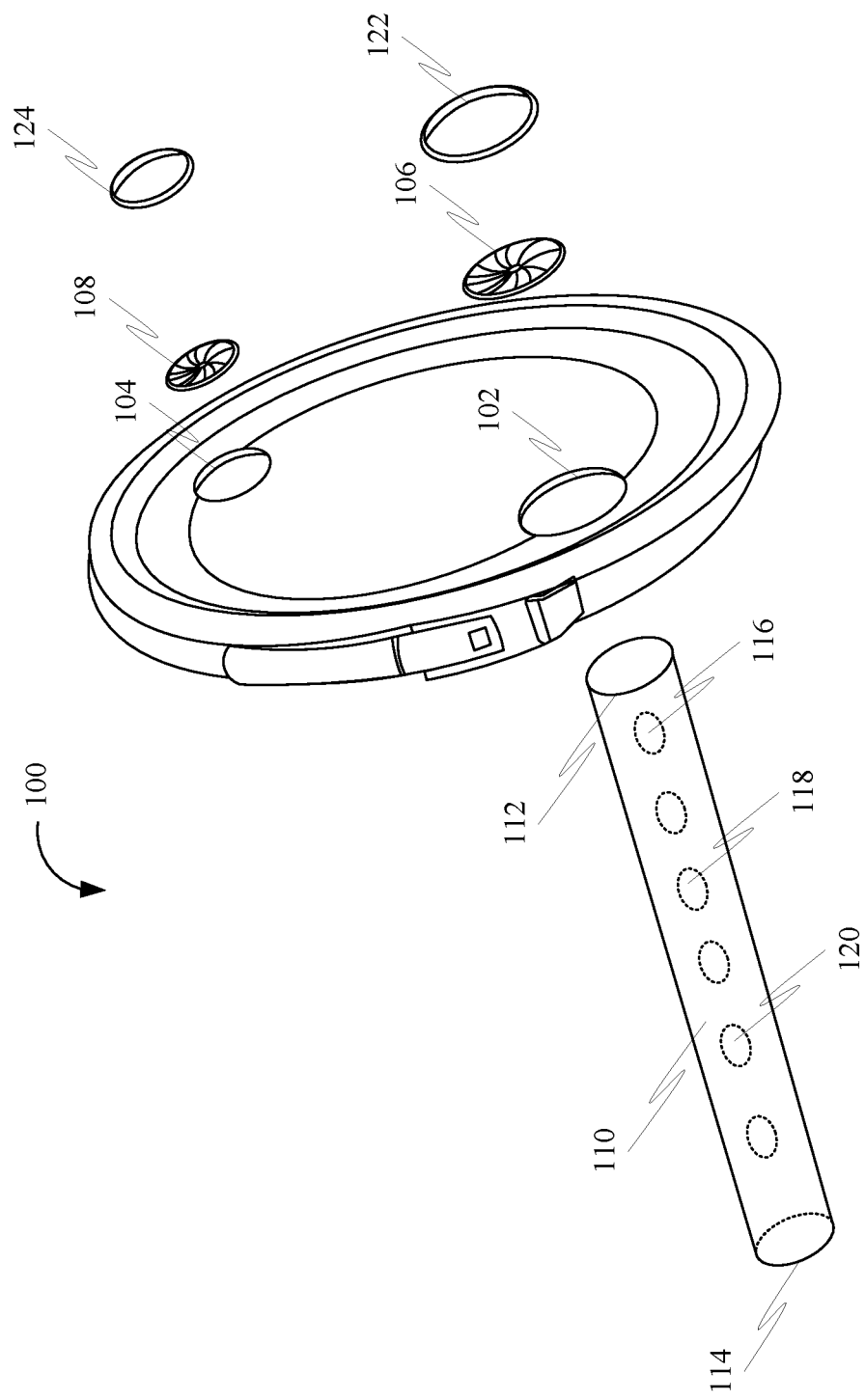
FIG. 1 is an exploded perspective view of a barrel lid for facilitating ventilating of a barrel, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure.

Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of a barrel lid for facilitating ventilating of a barrel, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer, etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more, and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes a barrel lid for facilitating ventilating of a barrel. Further, the ventilating of the barrel facilitates curing of contents disposed in the barrel. Further, the contents may include herbs, spices, botanical material, and/or cannabis/hemp. Further, the contents may include any organic material that needs curing.

Further, the present disclosure describes a system for facilitating automated drying/curing. Further, the system may be comprised in the barrel lid of the barrel. Further, the system may include a digital controller (processor), fans, check valves or electronically controlled valves, a temperature sensor, a humidity sensor, a small custom ventilation "snorkel" (not shown), an optional touch screen master controller, a communication device, and a storage device. Further, the digital controller may be configured to receive and process data received from the sensors (such as temperature/humidity sensors). Further, the digital controller may be configured to execute software instructions. Further, the digital controller may be wired to the fans (and both electronic valves if used) and connected to an LCD screen. Further, the digital controller may be mounted to the outside of a lid of a barrel and be powered by a rechargeable battery. Further, the LCD screen may display the current relative humidity of the barrel and the name of the contents and/or batch number. Further, a user may toggle through different screens with the buttons, to show when the next time to cycle, what is the humidity outside the barrel, the temperature, and to vent the individual barrel if they have a password (a combination of the buttons by the display, programmed by user admin prior). Further, the digital controller may allow admins to be able to make adjustments to each barrel if needed but may lock out anyone without the proper button sequence password. Typically, most of these functions may be controlled and monitored by the master controller, but the digital controller conveys rudimentary information and allows the user to program/monitor things to an extent as well. One of the buttons on the digital controller may link the individual barrel to the master controller via Bluetooth or another similar wireless method. The status of the barrel may be indicated by a small LED displaying it is as "inactive", "active", or "battery running low". Further, the communication device may be configured to receive and/or transmit data to external devices (such as the mobile device, other electronic devices, and the server). In order to cut down on cost, barrels themselves may be able to transmit data via Bluetooth to the master controller (no Wi-Fi capabilities). Further, the master controller may be connected to a Wi-Fi source, which would be able to have the data available on the internet. Further, the storage device may be configured to store data (such as sensor data). Further, the master controller may be a tablet-style touch screen computer. Further, the master controller may show relative humidity and temperature analytics for all barrels in real-time, as well as showing graphs of the analytics over the past number of days since the beginning of the cycle. Almost everything may be controlled from the master controller, as it is in wireless communication with each individual barrel. Further, the barrels (or groups of barrels) may also be given custom labels and/or batch numbers through the master controller to keep better track of contents in the barrel. Further, the user may have the ability to check on a group of barrels that have the same contents, to see how all barrels in that specific group have been doing, and to customize the programming (timer/humidity "on" parameter settings) for them as well. Accordingly, the user may program all the barrels' parameters in three ways such as program all, program each/any individual barrel, or program them by their groups/contents/batch numbers.

Further, the present disclosure describes a system for facilitating an automated drying/curing of herbs, spices, botanical material, and/or cannabis/hemp. Further, the system may be comprised in the barrel lid of the barrel (barrels). Further, the system may include a digital controller with an LCD screen and a few buttons, two fans, two check valves (or two electronically controlled valves), a temperature/humidity sensor, a small custom ventilation "snorkel", and an optional touch screen master controller. These components (minus the master controller) may attach onto a pre-existing 30-gallon barrel from "Uline" or similar. Once the disclosed system is active, air cycles from an inlet to an outlet (¾" and 2" NPS ports already built into the lid of the barrel), going through the "snorkel" ventilation ducting between the two, allowing air to flow consistently throughout the barrel and achieve airflow close to laminar in order to thoroughly ventilate all barrels' contents evenly. Further, the disclosed system may overcome an increased expense of buying many large containers to replace existing ones. If a cultivation center is already using these barrels or similar ones, they may not have to buy new vessels, nor throw theirs away. Large vessels may be expensive to ship, so it may save a customer not just in the merchandise cost, but also a large shipping cost. Further, the barrel may include a duct that may run alongside the wall of the barrel mostly conforming to its shape and not getting in the way of contents of the barrel. Further, the duct may run down the length of the barrel, connecting from the bottom of the barrel to the top of the barrel (consisting of an inlet port). Further, the duct may include holes or slats throughout the length of the duct. Further, the bottom of the duct may include more holes for promoting more even airflow. Moreover, if the holes are evenly spaced, the air takes the path of least resistance straight to an outlet, mostly passing over the top layer of the barrel, and not circulating as much through the bottom of the barrel. By having more holes in the bottom of the duct may counteract the barrel getting insufficient consistent airflow. Further, the holes may include a very fine metal screen, such that none of the contents of the barrel may get into the duct. Further, the top of the barrel may include a second part that may be embedded within the primary. The pieces may be locked together, but there may be a spring between them. When the user puts a barrel lid on, the user may have to line the inlet port up with the ducting, so the two fit together. Further, the second part may extend just above the barrel lid, such that that the user may easily mount them. Once lined up, the user may push the barrel lid down and secure it to the barrel with brackets they come with. Further, the barrel lid may not be able to close properly unless the inlet port is properly lined up with the ducting, thus ensuring that the system is properly vented (through the "snorkel") every time the lid is secured to the barrel. Further, the master controller (touchscreen tablet) may have Wi-Fi capabilities, enabling it to be monitored or controlled remotely, by certain Admins who have the login information. Further, the temperature/humidity sensor may include a thermometer hygrometer. Further, the thermometer hygrometers (temperature/humidity sensors) disposed in the barrels may have the capability of wirelessly communicating with the master controller that may be a large tablet that may log all the sensor data. Further, the thermometer hygrometers may also give a user the capability of manually venting any of the barrels, and to program the system to when and for how long to vent the barrels.

Further, the disclosed system may have either two fans and two check valves, or two air pumps that do not allow air to pass through them when they are "OFF". Further, the at least two fans may instead be a single fan, or the at least two pumps may instead be a single pump. Further, the fans or pumps may be controlled by a microcontroller (digital controller) which may be programmed by an LCD screen that is either touch screen or controlled by a few buttons. According to how it is programmed by a user, the microcontroller may turn the pumps or fans "ON" for a "cycle". Further, the fans/pumps may be attached to the ports, making them inlets/outlets for air to exchange through. If small fans and check valves are used, then the fans may break the seal of the valves when the cycle is started. Once it is done (around 5 minutes), the fans may stop, then reverse direction for a second or two to ensure the back pressure created closes the check valves back to a sealed position once the cycle is over. If the design ends up using pumps instead, they may most likely be ones that do not allow air to pass through them when they are in the "OFF" position. So, if these "sealed" pumps are used, then the check valves may probably be taken out of the system as the pumps' internal seal may be able to act in its place. Further, the disclosed system may have the seals controlled by servo motors, solenoids, or some other electronic valves. Further, a custom ducting may run alongside the rim of the barrel, going from the inlet to the bottom of the barrel. Further, custom ducting may have holes or slats throughout it to allow air to flow more evenly throughout the barrel, instead of only exchanging in a direct line from the inlet to the outlet at the top (shortest path).

Further, the present disclosure describes a system to facilitate automated curing of herbs, spices, botanical material, and/or cannabis/hemp. Further, the system may be comprised in the barrel lid of the barrel. Further, the system may include a digital controller (processor), fans (fan 1 and fan 2), check valves (check valve 1 and check valve 2) or electronically controlled valves, a temperature sensor, a humidity sensor, a small custom ventilation "snorkel" (not shown), an optional touch screen master controller, a communication device, and a storage device. Further, the digital controller may be configured to receive and process data received from the sensors (such as temperature/humidity sensors). Further, the digital controller may be configured to execute software instructions. Further, the digital controller may be wired to the fans (and both electronic valves if used) and connected to an LCD screen. Further, the digital controller may be mounted to the outside of a lid of a barrel and be powered by a rechargeable battery. Further, the LCD screen may display the current relative humidity of the barrel and the name of the contents and/or batch number. Further, a user may toggle through different screens with the buttons, to show when the next time to cycle, what is the humidity outside the barrel, the temperature, and to vent the individual barrel if they have a password (a combination of the buttons by the display, programmed by user admin prior). Further, the digital controller may allow admins to be able to make adjustments to each barrel if needed but may lock out anyone without the proper button sequence password. Typically, most of these functions may be controlled and monitored by the master controller, but the digital controller conveys rudimentary information and allows the user to program/monitor things to an extent as well. One of the buttons on the digital controller may link the individual barrel to the master controller via Bluetooth or another similar wireless method. The status of the barrel may be indicated by a small LED displaying it is as "inactive", "active", or "battery running low". Further, the communication device may be configured to receive and/or transmit data to external devices. Further, the storage device may be configured to store data (such as sensor data). Further, the master controller may be a tablet-style touch screen computer. Further, the master controller may show relative humidity and temperature analytics for all barrels in real-time, as well as showing graphs of the analytics over the past number of days since the beginning of the cycle. Almost everything may be controlled from the master controller, as it is in wireless communication with each individual barrel. Further, the barrels (or groups of barrels) may also be given custom labels and/or batch numbers through the master controller to keep better track of contents in the barrel. Further, the user may have the ability to check on a group of barrels that have the same contents, to see how all barrels in that specific group have been doing, and to customize the programming (timer/humidity "on" parameter settings) for them as well. Accordingly, the user may program all the barrels' parameters in three ways such as program all, program each/any individual barrel, or program them by their groups/contents/batch numbers.

Further, the present disclosure describes a method to facilitate automated curing of herbs, spices, botanical material, and/or cannabis/hemp using the barrel lid of the barrel. Further, the digital controller may activate the system by using at least one method. Further, the at least one method may include a manual method, a timer method, a sensor method. Further, the manual method may facilitate activating the system manually by a user. Further, the timer method may facilitate activating the system after a fixed time set by the user. Further, the sensor method may facilitate activating the system by sensing sensor data associated with the temperature/humidity sensor fitted inside a barrel. Further, once the system is activated, the fans (two fans) may be turned "ON". Further, the fans may be faced opposite to each other, thereby forcing one of the ports to be an inlet port and the other port to be an outlet port. Further, the air may be sent down from the inlet port into the snorkel vent, thereby allowing the air to reach the middle and bottom of the barrel. Further, the air may be distributed evenly throughout the barrel and its contents. Further, the system may open seals of the check valves because of the pressure exerted on the check valves by the fans being turned "ON". Further, in some embodiments, the system may open seals of the electronically controlled valves (two electronically controlled valves) that may be activated by the digital controller, controlling the fans as well. Further, the system may remain active for a time of about 5 minutes as a default (ventilation time). Further, the user may program the time for a shorter or longer ventilation time if required. Further, once the ventilation time is expended, the digital controller may turn the fans "OFF". Further, the system may be put into an initial sealed (inactive state) by using one or more methods. Further, a first method of the one or more methods may include turning back the fans "ON" in reverse by the digital controller, thereby putting back the pressure onto the check valves causing them to seal. Further, in some embodiments, a second method of the one or more methods may include activating the electronically controlled check valves, thereby sealing the system. Further, the system may remain resting in the inactive (sealed) state majority of the time, since curing involves keeping a container mostly sealed. Once the system gets activated again by the at least one method, the system may restart again. Further, the system may be pre-set to cure for about two weeks. Further, the user may program the length of time (curing time) shorter or longer if required. Once the curing time is over, the master controller may show "Curing Complete" on the screen. Further, the master controller may notify the user via text, an application, a browser, etc. that the curing of herbs, spices, botanical material, and/or cannabis/hemp is completed. Further, the user may have access to most system features, once the system is remotely linked to the master controller. Further, the system features may include features such as activate the system(s) to cure, program the ventilation times and full allotted curing time, check the current and past humidity/temperature analytics, etc.

FIG. 1 is an exploded perspective view of a barrel lid 100 for facilitating ventilating of a barrel (such as the barrel 1000), in accordance with some embodiments. Further, the barrel lid 100 may be configured to be coupled with an opening of the barrel. Further, the barrel may include a 30-gallon barrel. Further, the barrel lid 100 may be configured to be removably coupled with the opening of the barrel. Further, the barrel may include an interior space. Further, the barrel lid 100 may include at least two ports 102-104 disposed on the barrel lid 100. Further, the at least two ports 102-104 lead into the interior space from an exterior space outside of the barrel. Further, the barrel lid 100 may include at least two pumps 106-108, at least one duct 110, and at least two valves 122-124.

Further, the at least two pumps 106-108 may be attached to the at least two ports 102-104. Further, the at least two pumps 106-108 may include an inlet pump 106 attached to an inlet port 102 of the at least two ports 102-104 and an outlet pump 108 attached to an outlet port 104 of the at least two ports 102-104. Further, the inlet pump 106 may be configured for drawing external air into the interior space from the exterior space through the inlet port 102. Further, the outlet pump 108 may be configured for expelling internal air from the interior space into the exterior space through the outlet port 104. Further, the at least two pumps 106-108 may include at least two fans.

Further, the at least one duct 110 may be coupled with the inlet port 102. Further, the at least one duct 110 may include a snorkel. Further, the at least one duct 110 may be configured to be disposed in the interior space of the barrel.

Further, the at least one duct 110 extends along a barrel length of the barrel. Further, the at least one duct 110 may include a plurality of openings 116-120 disposed along a length of the at least one duct 110 from a top end 112 of the at least one duct 110 to a bottom end 114 of the at least one duct 110. Further, the top end 112 of the at least one duct 110 may be fluidly coupled with the inlet port 102. Further, the plurality of openings 116-120 of the at least one duct 110 may be configured for creating a plurality of airflows in the interior space along the barrel length of the barrel for ventilating the interior space based on the drawing of the external air through the inlet port 102 and the expelling of the internal air through the outlet port 104.

Further, the at least two valves 122-124 may be attached to the at least two ports 102-104. Further, the at least two valves 122-124 may be configured for transitioning between an open state and a closed state for openably closing the at least two ports 102-104. Further, the at least two valves 122-124 may be configured for opening the at least two ports 102-104 based on the transitioning of the at least two valves 122-124 from the closed state to the open state. Further, the opening of the at least two ports 102-104 unseals the barrel. Further, the drawing of the external air through the inlet port 102 and the expelling of the internal air through the outlet port 104 may be based on the opening of the at least two ports 102-104.

Figure 3:
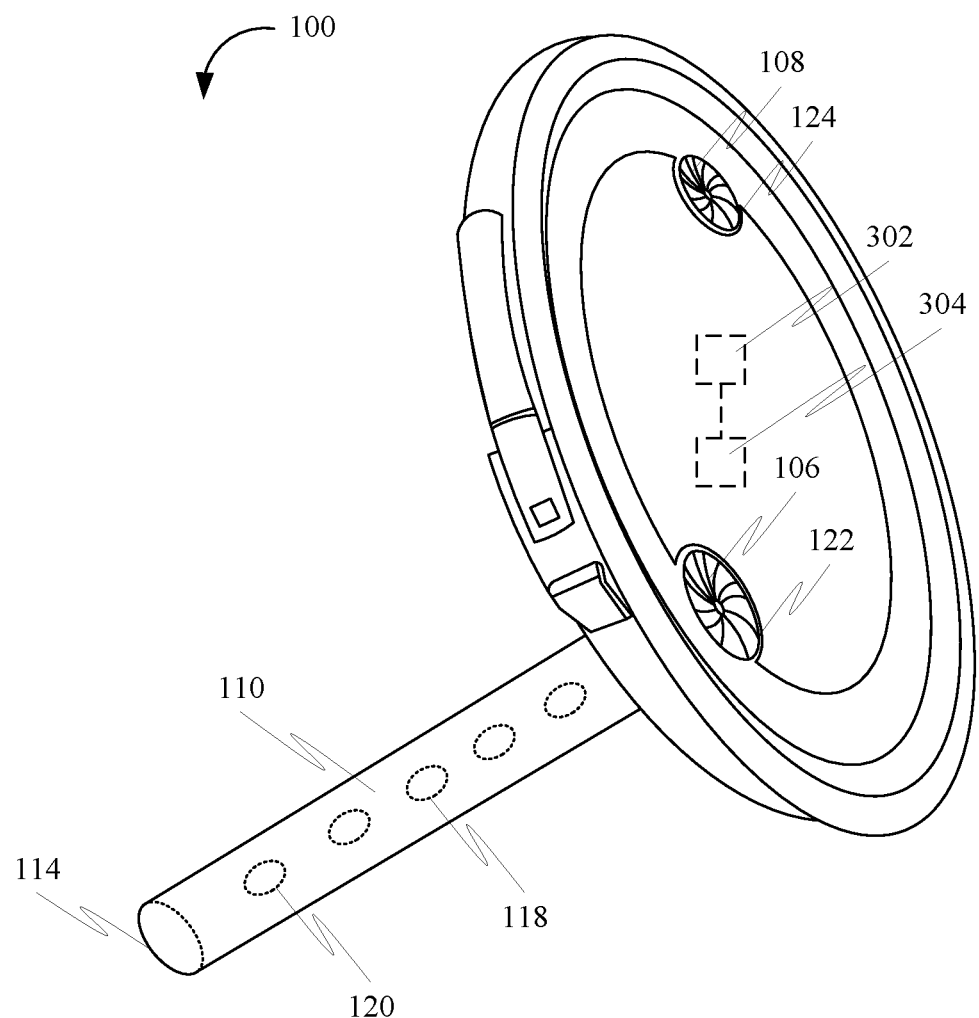
FIG. 3 is a perspective view of the barrel lid, in accordance with some embodiments.
Figure 4:
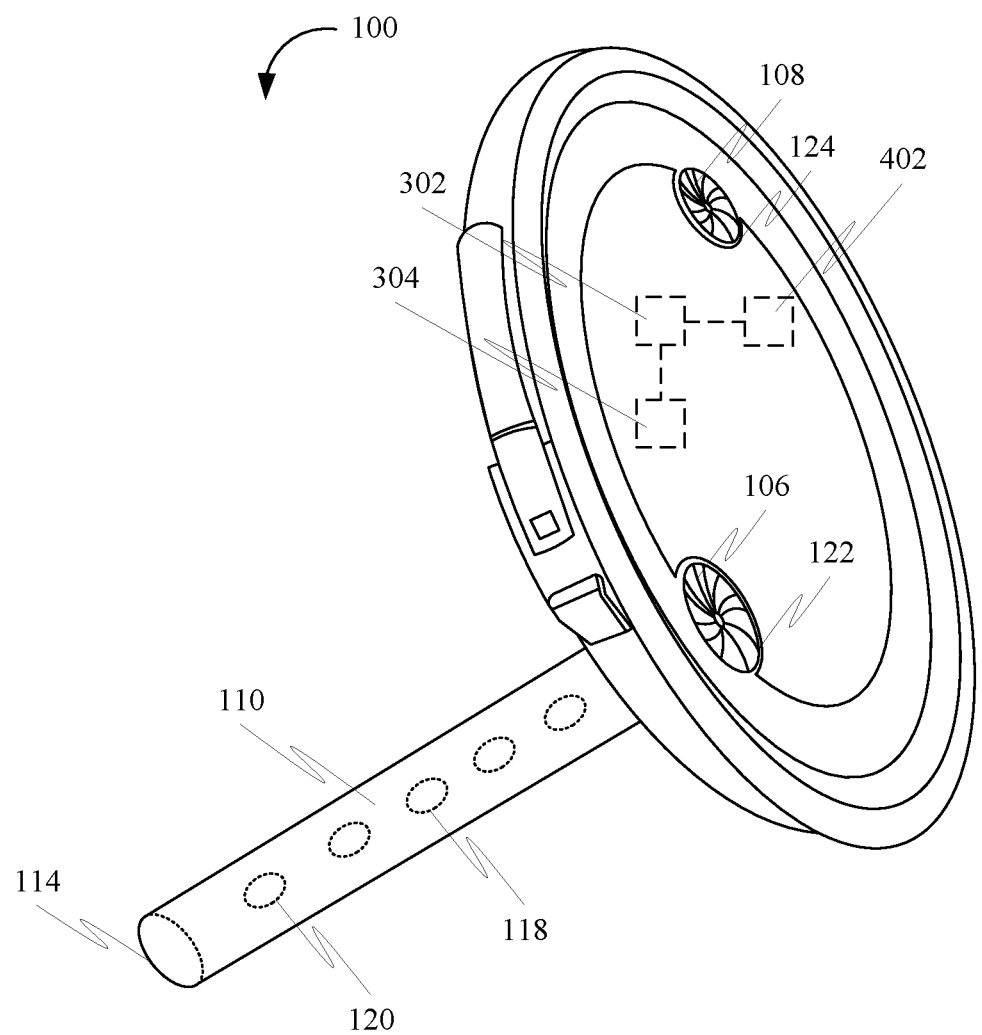
FIG. 4 is a perspective view of the barrel lid, in accordance with some embodiments.

In further embodiments, the barrel lid 100 may further include a controller 304 and a memory device 302, as shown in FIG. 3. Further, the barrel lid 100 may be configured for facilitating curing of a content disposed in the interior space of the barrel based on the ventilating of the interior space. Further, the content may include an organic material. Further, the content may include herbs, spices, botanical material, cannabis/hemp, etc. Further, the controller 304 may be communicatively coupled with the at least two pumps 106-108. Further, the controller 304 may include a digital controller, a master controller, etc. Further, the controller 304 may be configured for analyzing operational data associated with the at least two pumps 106-108. Further, the operation data may include at least one ventilation instance of the ventilating, at least one ventilation duration of the ventilating, at least one ventilating cycle of the ventilating, etc. required for the curing of the content. Further, the at least one ventilation duration may include at least one second, at least one minute, etc. Further, the at least one ventilating cycle may include at least one time in at least one hour, at least one day, at least one week, etc. Further, the controller 304 may be configured for determining at least one operating parameter associated with the at least two pumps 106-108 based on the analyzing. Further, the at least one parameter may include an initiating instance for initiating the ventilating, a terminating instance for terminating the ventilating, etc. Further, the ventilating may include the drawing of the external air and the expelling of the internal air. Further, the controller 304 may be configured for generating an operating command based on the determining. Further, the drawing of the external air through the inlet port 102 and the expelling of the internal air through the outlet port 104 may be based on the operating command. Further, the ventilating may include the drawing of the external air and the expelling of the internal air. Further, the memory device 302 may be communicatively coupled with the controller 304. Further, the memory device 302 may be configured for storing the operational data. Further, in an embodiment, the transitioning of the at least two valves 122-124 between the open state and the closed state may be based on the operating command. Further, the at least two valves 122-124 may include electronic valves. Further, in an embodiment, a communication device 402, as shown in FIG. 4, may be communicatively coupled with the memory device 302. Further, the communication device 402 may be configured for receiving the operational data from at least one input device. Further, the at least one input device may be associated with at least one user. Further, the at least one input device may be configured for generating the operational data. Further, the storing of the operational data may be based on the receiving. Further, the communication device 402 may be configured for receiving the operational data from the at least one input device over at least one of a wired communication channel and a wireless communication channel. Further, the wireless communication channel may include Bluetooth, Infrared, WiFi, etc. Further, the at least one input device may include a touchscreen, a button, a computing device, etc. Further, the computing device may include a smartphone, a tablet, a desktop, a laptop, a smartwatch, etc.

Figure 5:
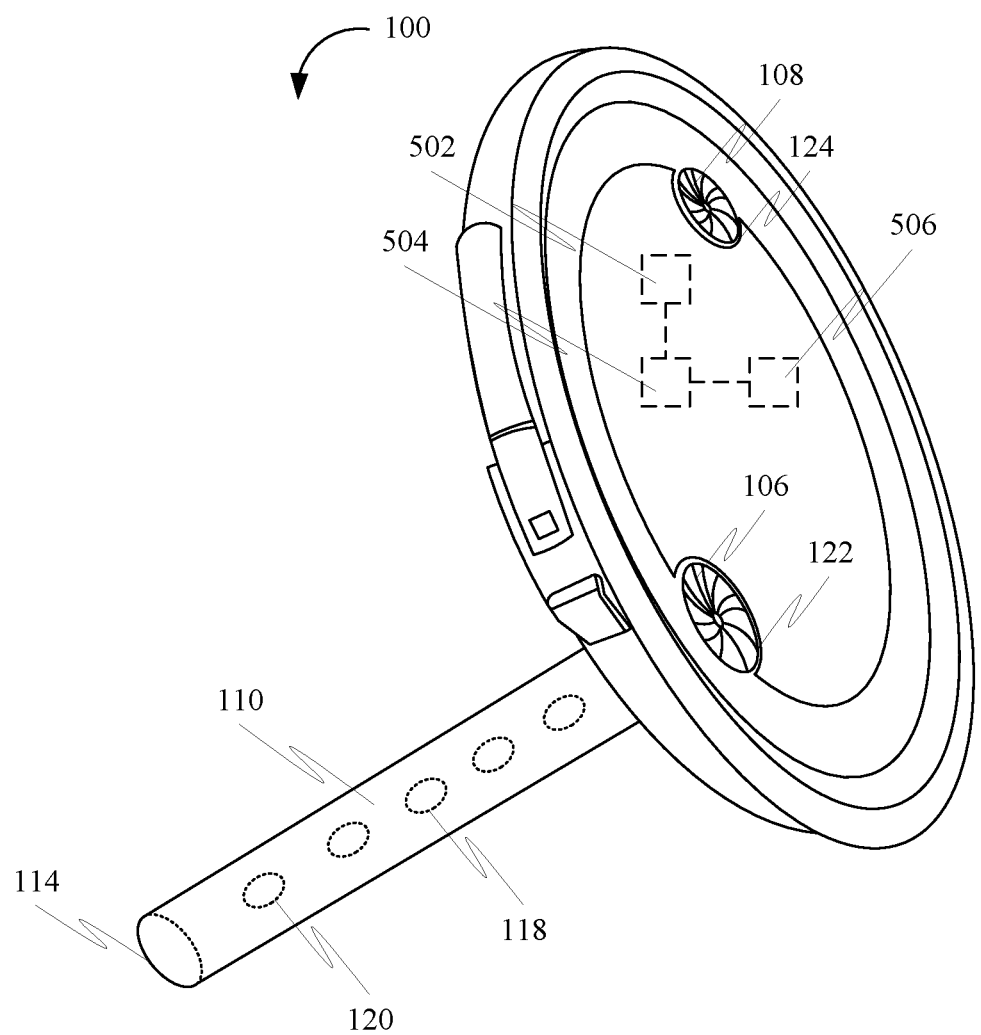
FIG. 5 is a perspective view of the barrel lid, in accordance with some embodiments.
Figure 6:
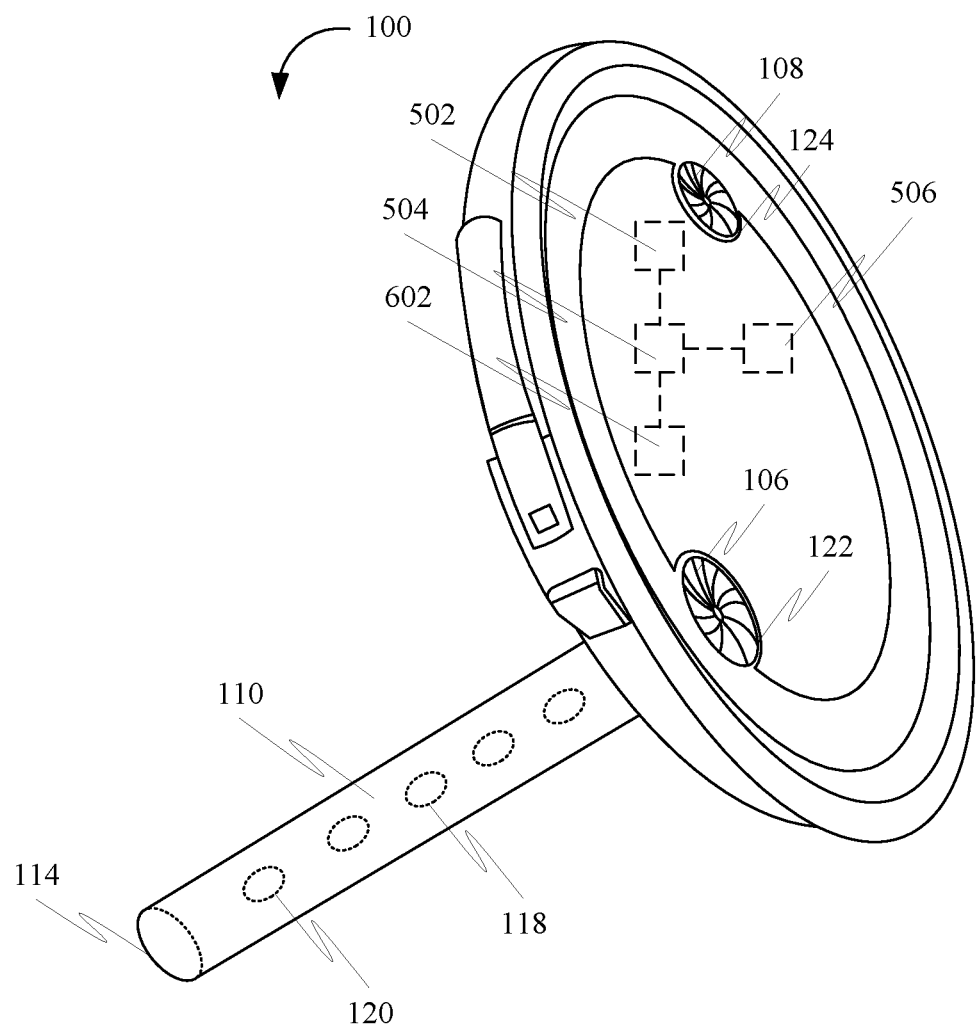
FIG. 6 is a perspective view of the barrel lid, in accordance with some embodiments.
Figure 7:
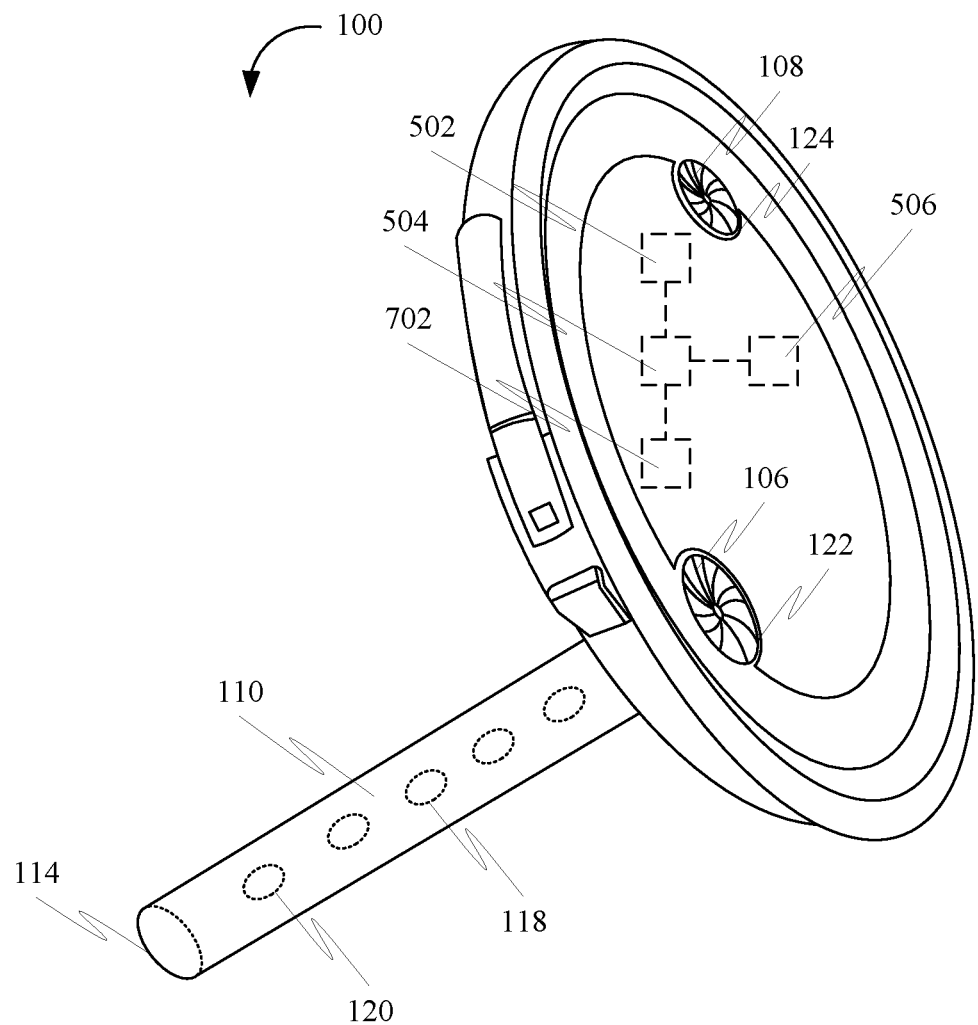
FIG. 7 is a perspective view of the barrel lid, in accordance with some embodiments.

In further embodiments, the barrel lid 100 may further include at least one interior sensor 502, a controller 504, and a memory device 506, as shown in FIG. 5. Further, the at least one interior sensor 502 may be configured for generating at least one interior sensor data based on at least one physical variable associated with the interior space of the barrel. Further, the at least one interior sensor 502 may include a thermometer hygrometer. Further, the at least one physical variable may include a temperature, a relative humidity, a pressure, a composition of the internal air, etc. Further, the controller 504 may be communicatively coupled with the at least one interior sensor 502 and the at least two pumps 106-108. Further, the controller 504 may be configured for analyzing the at least one interior sensor data. Further, the at least one interior sensor data may include at least one interior value of the at least one physical variable. Further, the controller 504 may be configured for comparing the at least one interior value with at least one interior predetermined value of the at least one physical variable. Further, the at least one interior predetermined value of the at least one physical variable corresponds to at least one condition required for the curing of the content disposed in the interior space. Further, the controller 504 may be configured for determining at least one operating parameter associated with the at least two pumps 106-108 based on the comparing. Further, the controller 504 may be configured for generating a first operating command based on the determining. Further, the drawing of the external air through the inlet port 102 and the expelling of the internal air through the outlet port 104 may be based on the first operating command. Further, the memory device 506 may be communicatively coupled with the controller 504. Further, the memory device 506 may be configured for storing the at least one interior predetermined value. Further, in an embodiment, the memory device 506 may be configured for storing the at least one interior sensor data. Further, in an embodiment, a communication device may be communicatively coupled with the at least one interior sensor 502. Further, the communication device may be configured for transmitting the at least one interior sensor data to at least one user device over at least one of a wired communication channel and a wireless communication channel. Further, the wireless communication channel may include Bluetooth, Infrared, WiFi, etc. Further, the at least one user device may be configured for displaying the at least one interior sensor data. Further, in an embodiment, the at least one interior sensor 502 may include an interior temperature sensor and an interior humidity sensor. Further, the interior temperature sensor may be configured for generating interior temperature data based on a temperature of the interior space. Further, the interior humidity sensor may be configured for generating interior humidity data based on a relative humidity of the interior space. Further, the at least one interior sensor data may include the interior temperature data and the interior humidity data. Further, in an embodiment, the memory device 506 may be configured for storing the at least one exterior sensor data Further, in an embodiment, at least one content sensor 602, as shown in FIG. 6, may be configured for generating at least one content data based on the content disposed in the interior space of the barrel. Further, the at least one content data may include a state of the content. Further, the state corresponds to a composition of the content. Further, the state corresponds to at least one curing stage associated with the curing of the content. Further, the controller 504 may be communicatively coupled with the at least one content sensor 602. Further, the controller 504 may be configured for analyzing the at least one content data based on at least one process associated with the content. Further, the at least one process may include the curing, drying, etc. Further, the controller 504 may be configured for generating the at least one interior predetermined value for the at least one process associated with the content based on the analyzing of the at least one content data. Further, the storing of the at least one interior predetermined value may be based on the generating of the at least one interior predetermined value. Further, in an embodiment, at least one exterior sensor 702, as shown in FIG. 7, may be configured for generating at least one exterior sensor data based on at least one physical variable associated with the exterior space outside of the barrel. Further, the at least one exterior sensor 702 may include a thermometer hygrometer. Further, the at least one physical variable a temperature, a relative humidity, a pressure, a composition of the internal air, etc. Further, the controller 504 may be communicatively coupled with the at least one exterior sensor 702. Further, the controller 504 may be configured for analyzing the at least one exterior sensor data. Further, the at least one exterior sensor data may include at least one exterior value of the at least one physical variable associated with the exterior space. Further, the controller 504 may be configured for comparing the at least one exterior value with at least one exterior predetermined value of the at least one physical variable. Further, the determining of the at least one operating parameter may be based on the comparing of the at least one exterior value with the at least one exterior predetermined value. Further, the memory device 506 may be configured for storing the at least one exterior predetermined value. Further, in an embodiment, the at least one exterior sensor 702 may include an exterior temperature sensor and an exterior humidity sensor. Further, the exterior temperature sensor may be configured for generating exterior temperature data based on a temperature of the exterior space. Further, the exterior humidity sensor may be configured for generating exterior humidity data based on a relative humidity of the exterior space. Further, the at least one exterior sensor data may include the exterior temperature data and the exterior humidity data.

Further, in some embodiments, the plurality of openings 116-120 may be associated with a number of openings. Further, the number of openings increases along the length of the at least one duct 110. Further, the plurality of airflows may include a plurality of even airflows. Further, the creating of the plurality of even airflows in the interior space may be based on the number of openings.

Figure 8:
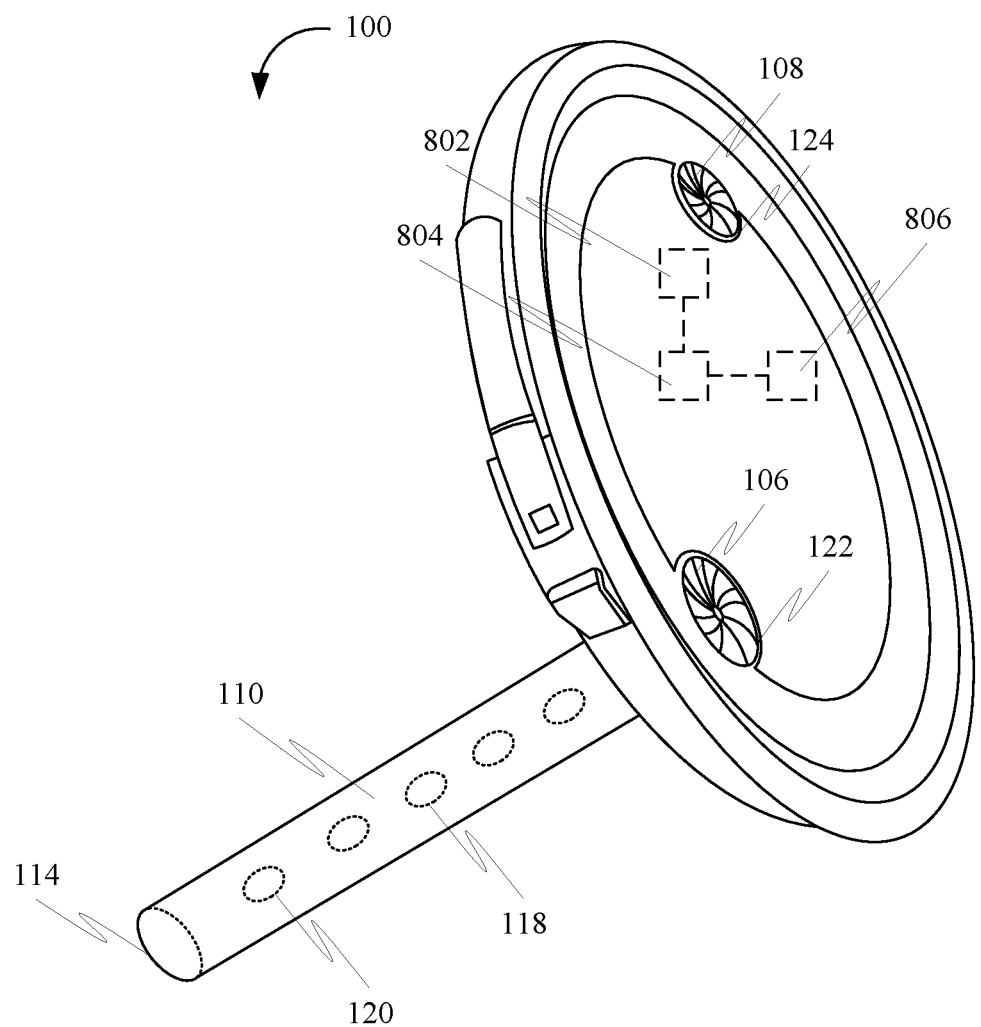
FIG. 8 is a perspective view of the barrel lid, in accordance with some embodiments.

In further embodiments, the barrel lid 100 may further include at least one sensor 802, a controller 804, and a communication device 806, as shown in FIG. 8. Further, the at least one sensor 802 may be configured for generating at least one sensor data based on at least one physical variable associated with the interior space of the barrel. Further, the at least one sensor 802 may include a thermometer hygrometer. Further, the at least one physical variable may include a temperature, a relative humidity, a pressure, etc. Further, the controller 804 may be communicatively coupled with the at least one sensor 802. Further, the controller 804 may be configured for analyzing the at least one sensor data. Further, the at least one sensor data may include at least one value of the at least one physical variable. Further, the controller 804 may be configured for comparing the at least one value with at least one predetermined value of the at least one physical variable. Further, the controller 804 may be configured for determining at least one action performable on the at least two pumps 106-108 based on the comparing. Further, the at least one action may include initiating the at least two pumps 106-108, terminating the at least two pumps 106-108, etc. Further, the initiating of the at least two pumps 106-108 initiates the drawing of the external air and the expelling of the internal air for initiating the ventilating. Further, the terminating of the at least two pumps 106-108 terminates the drawing of the external air and the expelling of the internal air for terminating the ventilating. Further, the controller 804 may be configured for generating at least one alert associated with the at least one action based on the determining. Further, the at least one alert may include a visual alert, an aural alert, a haptic alert, etc. Further, the at least one alert may include a notification. Further, the at least one alert may include an initiating indication for the initiating of the at least two pumps 106-108, a terminating indication for the terminating of the at least two pumps 106-108, etc. Further, the communication device 806 may be communicatively coupled with the controller 804. Further, the communication device 806 may be configured for transmitting the at least one alert to at least one output device. Further, the at least one output device may be associated with at least one user. Further, the at least one output device may be configured for presenting the at least one alert. Further, the at least one output device may include a display device, a computing device, a speaker, etc. Further, the communication device 806 may be configured for transmitting the at least one alert to the at least one output device over at least one of a wired communication channel and a wireless communication channel. Further, the wireless communication channel may include Bluetooth, Infrared, WiFi, etc.

Further, in some embodiments, the inlet pump 106 may be configured for creating a negative pressure in the inlet port 102. Further, the negative pressure may be lower than an atmospheric pressure associated with the exterior space. Further, the drawing of the external air through the inlet port 102 may be based on the creating of the negative pressure. Further, the outlet pump 108 may be configured for creating a positive pressure in the outlet port 104. Further, the positive pressure may be greater than the atmospheric pressure. Further, the expelling of the internal air through the outlet port 104 may be based on the creating of the positive pressure. Further, in an embodiment, the at least two valves 122-124 may include an inlet valve 122 associated with the inlet pump 106 and an outlet valve 124 associated with the outlet pump 108. Further, the inlet pump 106 may be configured for applying the negative pressure to the inlet valve 122 based on the creating of the negative pressure. Further, the inlet valve 122 transitions from the closed state to the open state based on the applying of the negative pressure for opening the inlet port 102. Further, the drawing of the external air through the inlet port 102 may be based on the opening of the inlet port 102. Further, in an embodiment, the outlet pump 108 may be configured for applying the positive pressure to the outlet port 104 based on the creating of the positive pressure. Further, the outlet valve 124 transitions from the closed state to the open state based on the applying of the positive pressure for opening the outlet port 104. Further, the expelling of the internal air through the outlet port 104 may be based on the opening of the outlet port 104.

Further, in some embodiments, the at least two valves 122-124 may be configured for closing the at least two ports 102-104 based on the transitioning of the at least two valves 122-124 from the open state to the closed state after the drawing of the external air through the inlet port 102 and the expelling of the internal air through the outlet port 104. Further, the closing of the at least two ports 102-104 seal the barrel.

Figure 2:
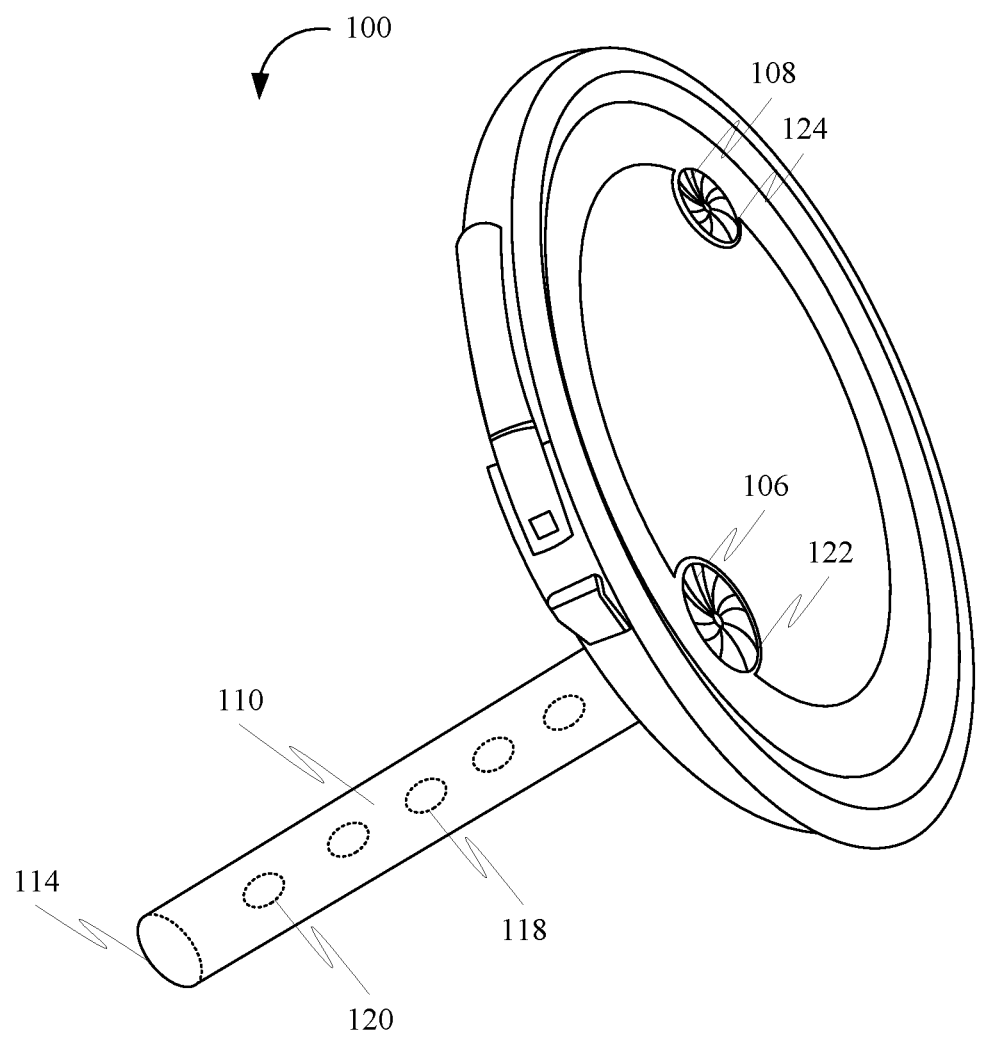
FIG. 2 is a perspective view of the barrel lid, in accordance with some embodiments.

FIG. 2 is a perspective view of the barrel lid 100, in accordance with some embodiments. Further, FIG. 2 is an assembled view of the barrel lid 100.

FIG. 3 is a perspective view of the barrel lid 100, in accordance with some embodiments.

FIG. 4 is a perspective view of the barrel lid 100, in accordance with some embodiments.

FIG. 5 is a perspective view of the barrel lid 100, in accordance with some embodiments.

FIG. 6 is a perspective view of the barrel lid 100, in accordance with some embodiments.

FIG. 7 is a perspective view of the barrel lid 100, in accordance with some embodiments.

FIG. 8 is a perspective view of the barrel lid 100, in accordance with some embodiments.

Figure 9:
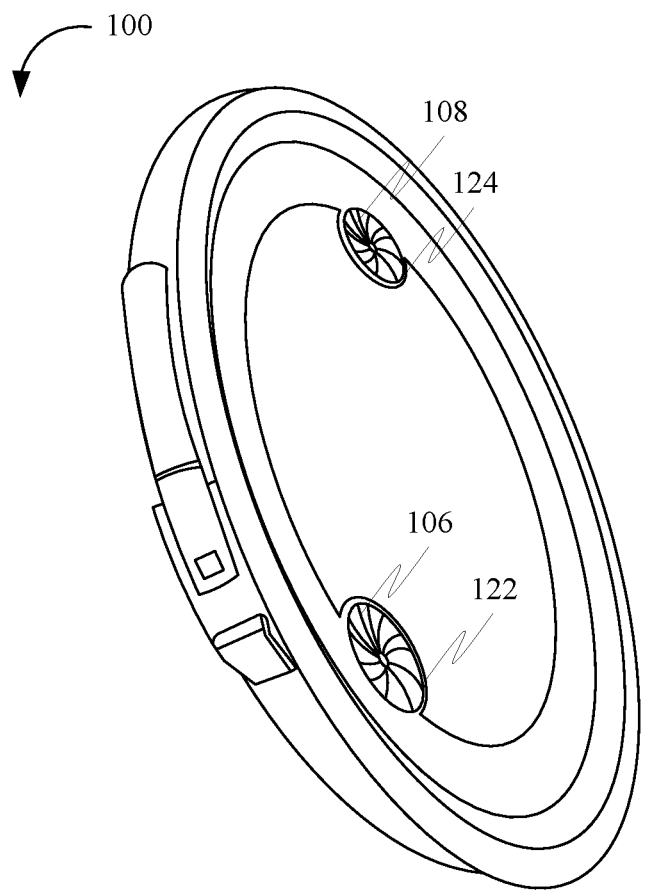
FIG. 9 is a perspective view of the barrel lid without the at least one duct, in accordance with some embodiments.

FIG. 9 is a perspective view of the barrel lid 100 without the at least one duct 110, in accordance with some embodiments.

Figure 10:
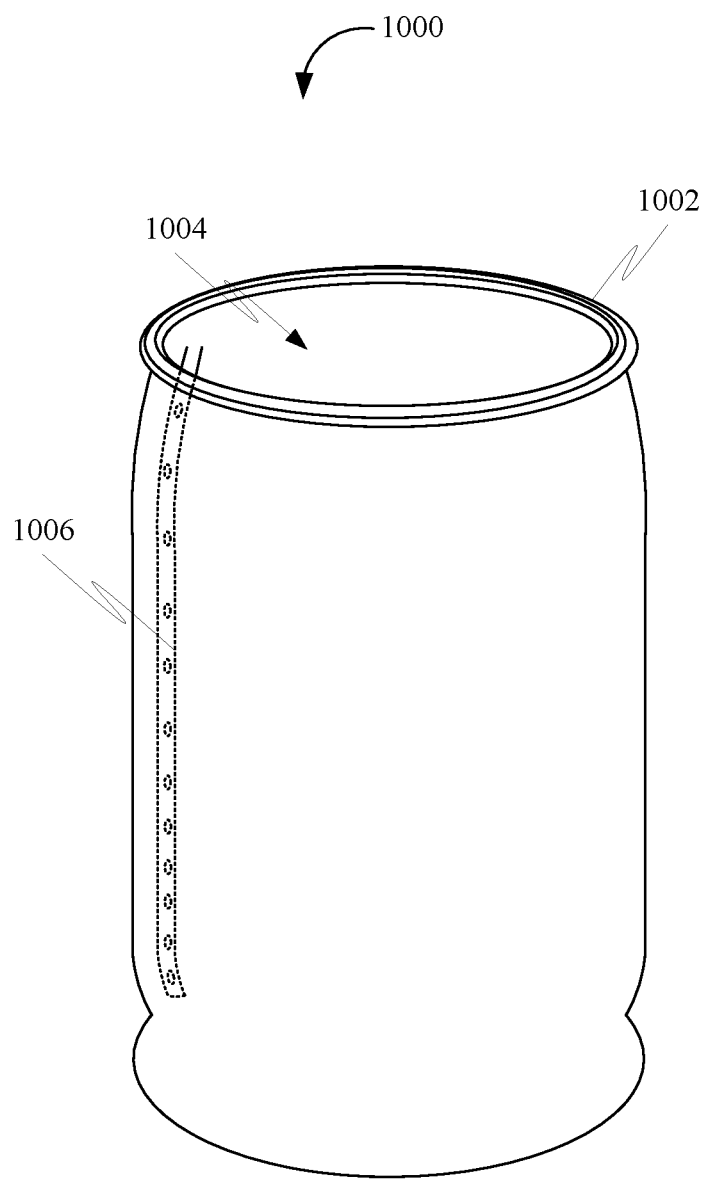
FIG. 10 is a front view of a barrel associated without a barrel lid, in accordance with some embodiments.

FIG. 10 is a front view of a barrel 1000 without a barrel lid (such as the barrel lid 100), in accordance with some embodiments. Further, the barrel 1000 may include an interior space 1004 and an opening 1002 leading into the interior space 1004 from an exterior space outside of the barrel 1000. Further, the barrel lid may be configured to be coupled with the opening 1002 of the barrel 1000. Further, at least one duct 1006 of the barrel lid may be disposed in the interior space 1004 of the barrel 1000.

Figure 11:
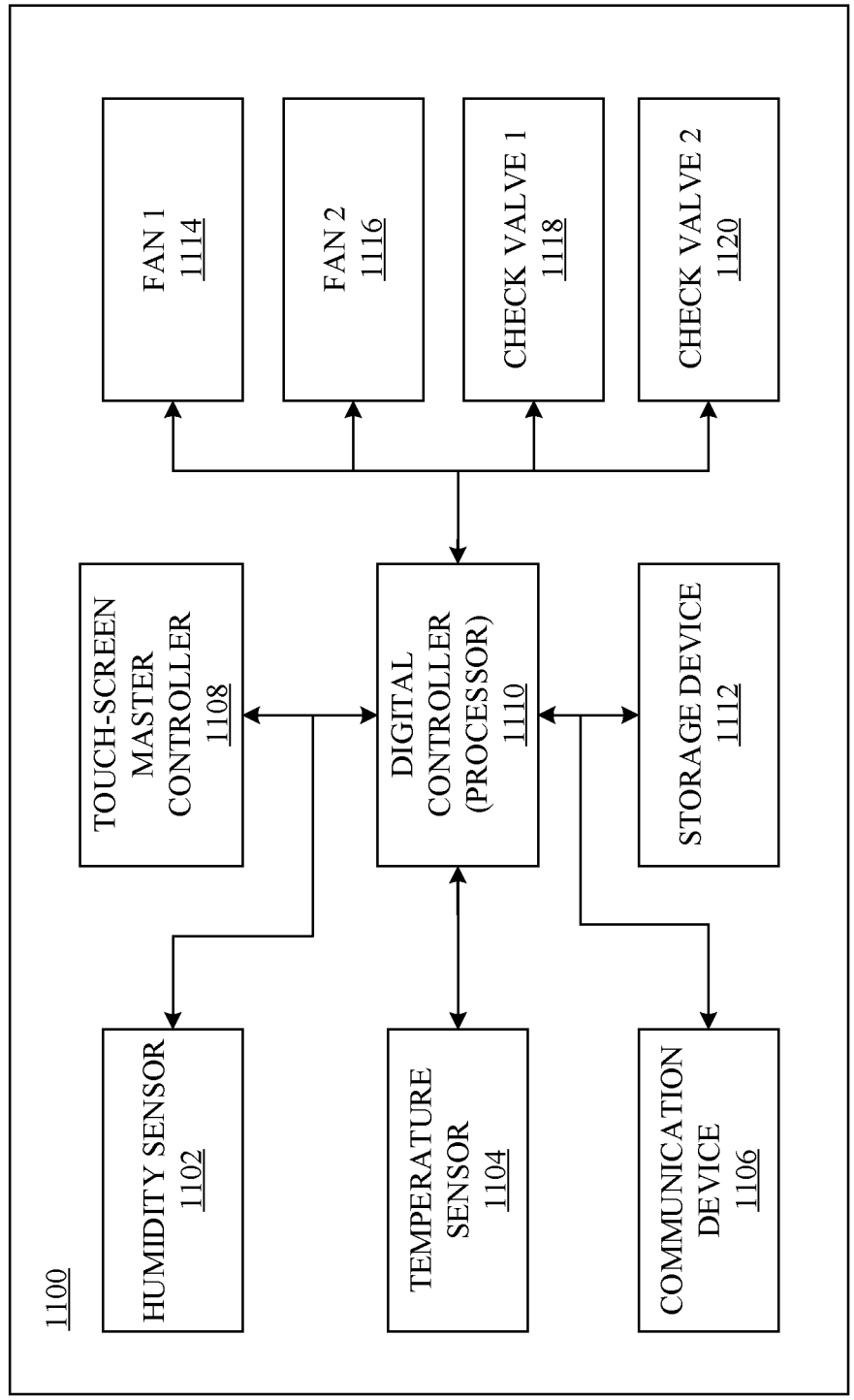
FIG. 11 is a block diagram of a system for facilitating ventilating of a barrel coupled with a barrel lid, in accordance with some embodiments.

FIG. 11 is a block diagram of a system 1100 for facilitating ventilating of a barrel coupled with a barrel lid, in accordance with some embodiments. Further, the system 1100 may include a digital controller (processor) 1110, fans 1114-1116 (fan 1 1114 and fan 2 1116), check valves 1118-1120 (check valve 1 1118 and check valve 2 1120) or electronically controlled valves, a temperature sensor 1104, a humidity sensor 1102, a small custom ventilation "snorkel" (not shown), an optional touch screen master controller 1108, a communication device 1106, and a storage device 1112.

Further, the digital controller 1110 may be configured to receive and process data received from the sensors (such as the temperature sensor 1104/the humidity sensor 1102). Further, the digital controller 1110 may be configured to execute software instructions. Further, the digital controller 1110 may be wired to the fans 1114-1116 (and both electronic valves if used) and connected to an LCD screen. Further, the digital controller 1110 may be mounted to the outside of a lid of a barrel and be powered by a rechargeable battery. Further, the LCD screen may display the current relative humidity of the barrel and the name of the contents and/or batch number. Further, a user may toggle through different screens with the buttons, to show when the next time to cycle, what is the humidity outside the barrel, the temperature, and to vent the individual barrel if they have a password (a combination of the buttons by the display, programmed by user admin prior). Further, the digital controller 1110 may allow admins to be able to make adjustments to each barrel if needed but may lock out anyone without the proper button sequence password.

Typically, most of these functions may be controlled and monitored by the master controller 1108, but the digital controller 1110 conveys rudimentary information and allows the user to program/monitor things to an extent as well. One of the buttons on the digital controller 1110 may link the individual barrel to the master controller 1108 via Bluetooth or another similar wireless method. The status of the barrel may be indicated by a small LED displaying it is as "inactive", "active", or "battery running low".

Further, the communication device 1106 may be configured to receive and/or transmit data to external devices.

Further, the storage device 1112 may be configured to store data (such as sensor data).

Further, the master controller 1108 may be a tablet-style touch screen computer. Further, the master controller 1108 may show relative humidity and temperature analytics for all barrels in real-time, as well as showing graphs of the analytics over the past number of days since the beginning of the cycle. Almost everything may be controlled from the master controller 1108, as it is in wireless communication with each individual barrel. Further, the barrels (or groups of barrels) may also be given custom labels and/or batch numbers through the master controller 1108 to keep better track of contents in the barrel. Further, the user may have the ability to check on a group of barrels that have the same contents, to see how all barrels in that specific group have been doing, and to customize the programming (timer/humidity "on" parameter settings) for them as well. Accordingly, the user may program all the barrels' parameters in three ways such as program all, program each/any individual barrel, or program them by their groups/contents/batch numbers.

Figure 12:
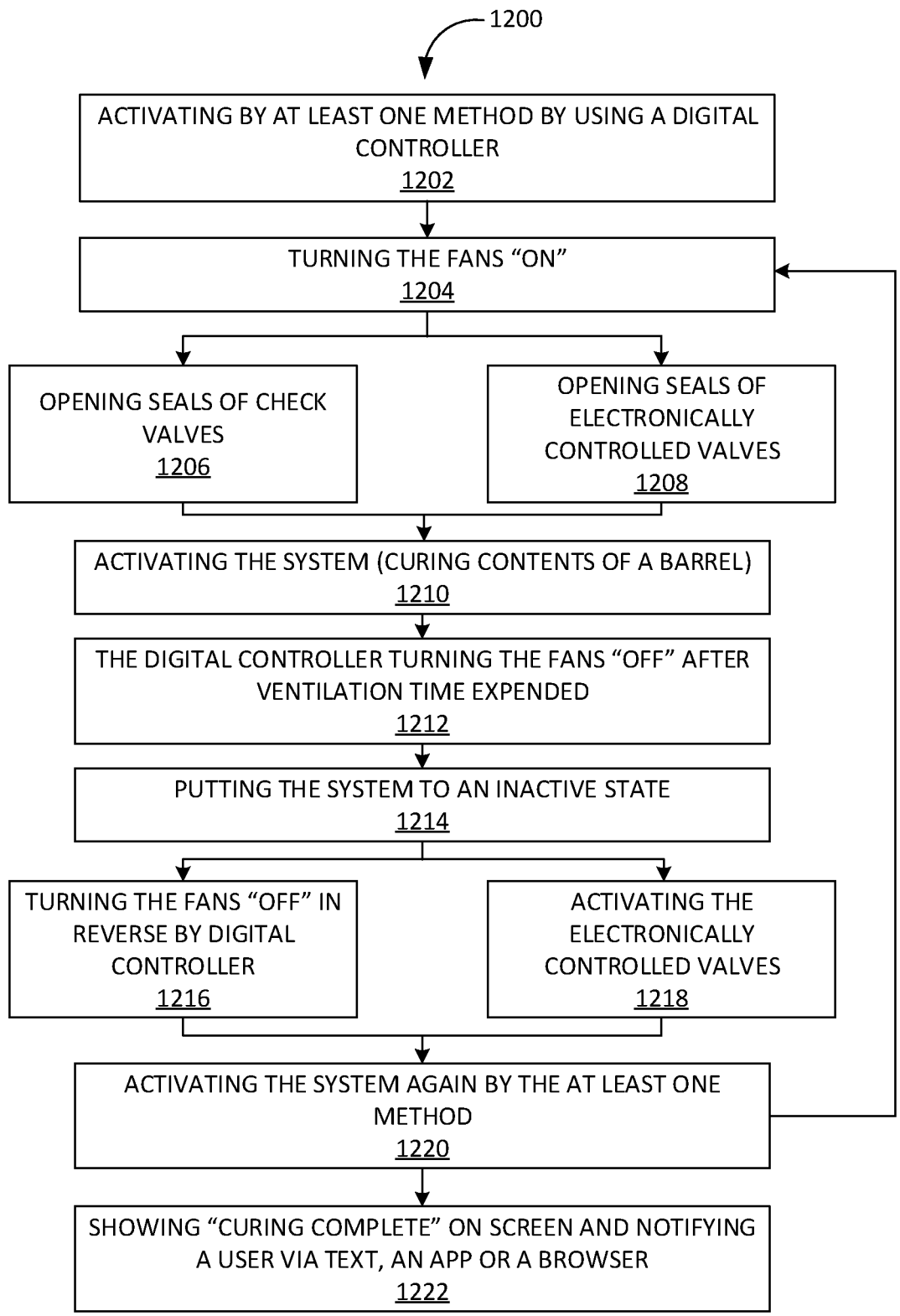
FIG. 12 is a flow diagram of a method for facilitating ventilating of a barrel coupled with a barrel lid, in accordance with some embodiments.

FIG. 12 is a flow diagram of a method 1200 for facilitating ventilating of a barrel coupled with a barrel lid, in accordance with some embodiments. Further, at 1202, the method 1200 may include activating at least one method by using a digital controller. Further, at 1204, the method 1200 may include turning the fans "on". Further, at 1206, the method 1200 may include opening seals of check valves.

Further, at 1208, the method 1200 may include opening seals of the electronically controlled valves. Further, at 1210, the method 1200 may include activating the system for curing contents of a barrel. Further, at 1212, the method 1200 may include turning the fans "off" by the digital controller after the ventilation time expended. Further, at 1214, the method 1200 may include putting the system to an inactive state. Further, at 1216, the method 1200 may include turning the fans "off" in reverse by the digital controller. Further, at 1218, the method 1200 may include activating the electronically controlled valves. Further, at 1220, the method 1200 may include activating the system again by the at least one method. Further, at 1222, the method 1200 may include showing "curing complete" on a screen and notifying a user via a text, an app, or a browser.

Figure 13:
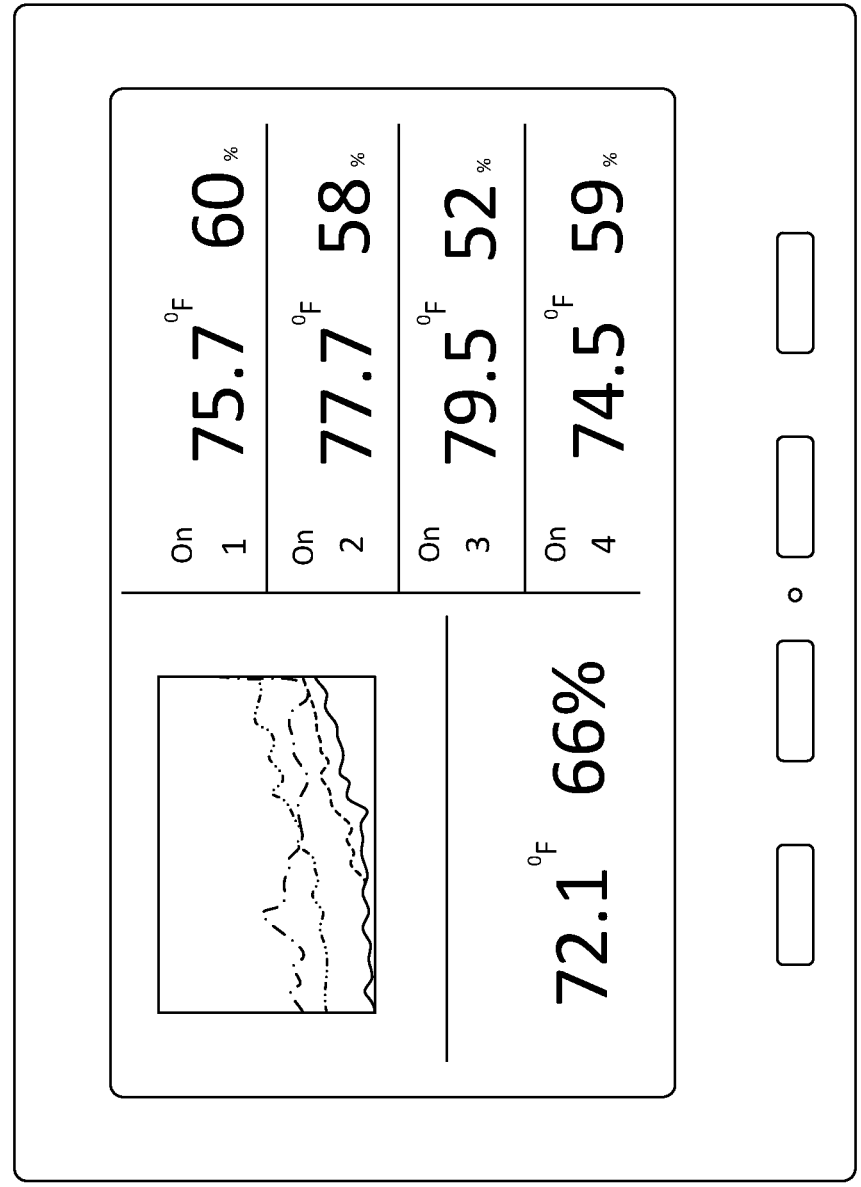
FIG. 13 is a front view of a controller of a barrel lid for facilitating ventilating of a barrel, in accordance with some embodiments.

FIG. 13 is a front view of a controller 1300 of a barrel lid for facilitating ventilating of a barrel, in accordance with some embodiments. Further, the barrel lid may be configured to be coupled with the barrel.

Figure 14:
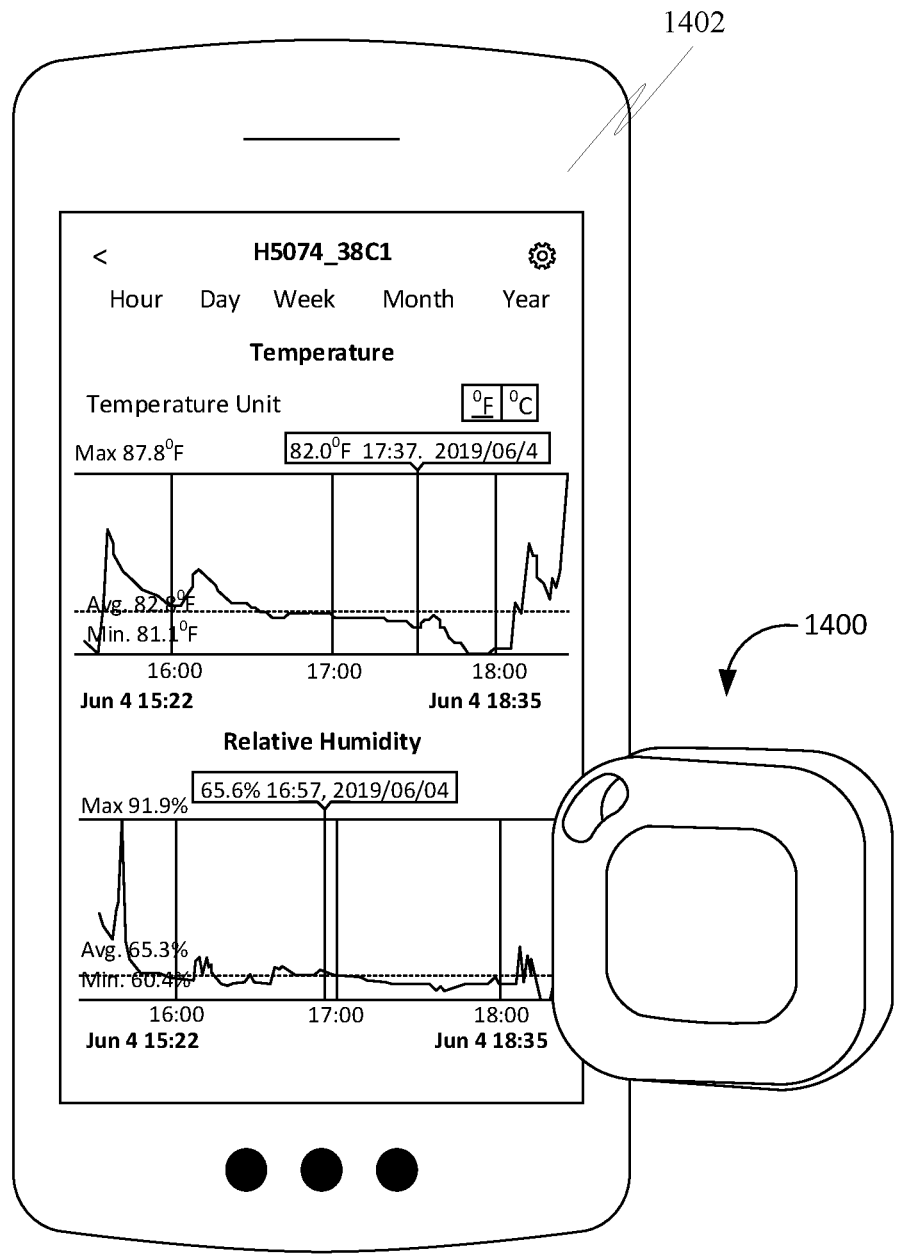
FIG. 14 is a perspective view of a thermometer hygrometer of the barrel lid with a user device, in accordance with some embodiments.

FIG. 14 is a perspective view of a thermometer hygrometer 1400 of the barrel lid with a user device 1402, in accordance with some embodiments. Further, the thermometer hygrometer 1400 may be configured for generating at least one of temperature data based on a temperature of an interior space of the barrel and humidity data based on a relative humidity of the interior space of the barrel. Further, the user device 1402 may be communicatively coupled with the thermometer hygrometer 1400. Further, the user device 1402 may be configured for receiving the at least one of the temperature data and the humidity data over at least one of a wired communication channel and a wireless communication channel. Further, the wireless communication channel may include Bluetooth, Infrared, WiFi, etc. Further, the user device 1402 may be configured for storing the at least one of the temperature data and the humidity data. Further, the user device 1402 may be configured for displaying the at least one of the temperature data and the humidity data. Further, the user device 1402 may include a computing device such as a smartphone, a tablet, a desktop, a laptop, a smartwatch, etc.

Figure 15:
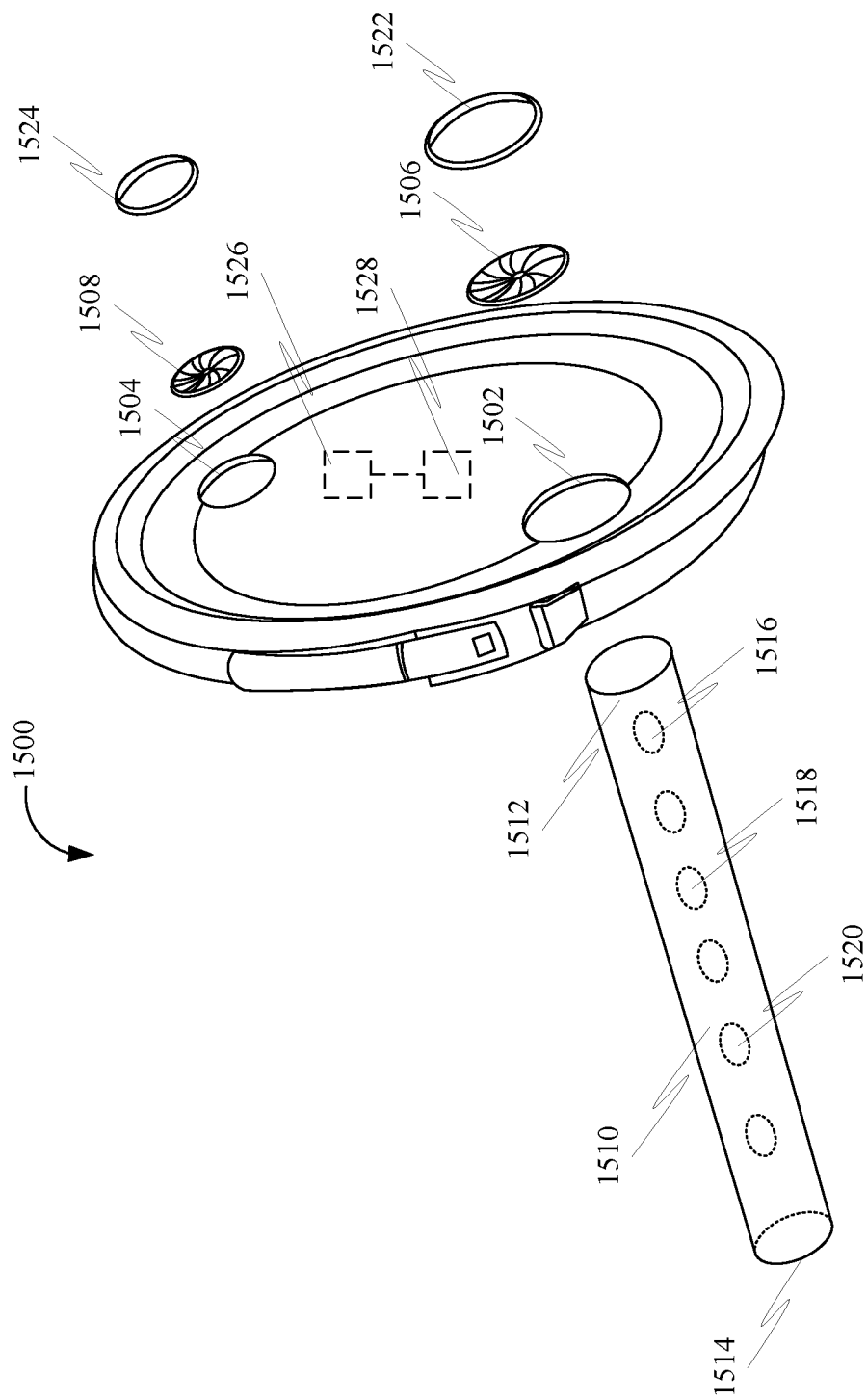
FIG. 15 is an exploded view of a barrel lid for facilitating ventilating of a barrel, in accordance with some embodiments.

FIG. 15 is an exploded view of a barrel lid 1500 for facilitating ventilating of a barrel, in accordance with some embodiments. Further, the barrel lid 1500 may be configured to be coupled with an opening of the barrel. Further, the barrel may include an interior space. Further, the barrel lid 1500 may include at least two ports 1502-1504 disposed on the barrel lid 1500. Further, the at least two ports 1502-1504 lead into the interior space from an exterior space outside of the barrel. Further, the barrel lid 1500 may include at least two pumps 1506-1508, at least one duct 1510, at least two valves 1522-1524, a controller 1528, and a memory device 1526.

Further, the at least two pumps 1506-1508 may be attached to the at least two ports 1502-1504. Further, the at least two pumps 1506-1508 may include an inlet pump 1506 attached to an inlet port 1502 of the at least two ports 1502-1504 and an outlet pump 1508 attached to an outlet port 1504 of the at least two ports 1502-1504. Further, the inlet pump 1506 may be configured for drawing external air into the interior space from the exterior space through the inlet port 1502. Further, the outlet pump 1508 may be configured for expelling internal air from the interior space into the exterior space through the outlet port 1504.

Further, the at least one duct 1510 may be coupled with the inlet port 1502. Further, the at least one duct 1510 may be configured to be disposed in the interior space of the barrel. Further, the at least one duct 1510 extends along a barrel length of the barrel. Further, the at least one duct 1510 may include a plurality of openings 1516-1520 disposed along a length of the at least one duct 1510 from a top end 1512 of the at least one duct 1510 to a bottom end 1514 of the at least one duct 1510. Further, the top end 1512 of the at least one duct 1510 may be fluidly coupled with the inlet port 1502. Further, the plurality of openings 1516-1520 of the at least one duct 1510 may be configured for creating a plurality of airflows in the interior space along the barrel length of the barrel for ventilating the interior space based on the drawing of the external air through the inlet port 1502 and the expelling of the internal air through the outlet port 1504.

Further, the at least two valves 1522-1524 may be attached to the at least two ports 1502-1504. Further, the at least two valves 1522-1524 may be configured for transitioning between an open state and a closed state for openably closing the at least two ports 1502-1504. Further, the at least two valves 1522-1524 may be configured for opening the at least two ports 1502-1504 based on the transitioning of the at least two valves 1522-1524 from the closed state to the open state. Further, the opening of the at least two ports 1502-1504 unseals the barrel. Further, the drawing of the external air through the inlet port 1502 and the expelling of the internal air through the outlet port 1504 may be based on the opening of the at least two ports 1502-1504.

Further, the controller 1528 may be communicatively coupled with the at least two pumps 1506-1508. Further, the controller 1528 may be configured for analyzing operational data associated with the at least two pumps 1506-1508. Further, the controller 1528 may be configured for determining at least one operating parameter associated with the at least two pumps 1506-1508 based on the analyzing. Further, the controller 1528 may be configured for generating an operating command based on the determining. Further, the drawing of the external air through the inlet port 1502 and the expelling of the internal air through the outlet port 1504 may be based on the operating command.

Further, the memory device 1526 may be communicatively coupled with the controller 1528. Further, the memory device 1526 may be configured for storing the operational data.

In further embodiments, a communication device may be communicatively coupled with the memory device 1526. Further, the communication device may be configured for receiving the operational data from at least one input device. Further, the at least one input device may be configured for generating the operational data. Further, the storing of the operational data may be based on the receiving.

Further, in some embodiments, the transitioning of the at least two valves 1522-1524 between the open state and the closed state may be based on the operating command.

Further, in some embodiments, the plurality of openings 1516-1520 may be associated with a number of openings. Further, the number of openings increases along the length of the at least one duct 1510. Further, the plurality of airflows may include a plurality of even airflows. Further, the creating of the plurality of even airflows in the interior space may be based on the number of openings.

Further, in some embodiments, the inlet pump 1506 may be configured for creating a negative pressure in the inlet port 1502. Further, the negative pressure may be lower than an atmospheric pressure associated with the exterior space. Further, the drawing of the external air through the inlet port 1502 may be based on the creating of the negative pressure. Further, the outlet pump 1508 may be configured for creating a positive pressure in the outlet port 1504. Further, the positive pressure may be greater than the atmospheric pressure. Further, the expelling of the internal air through the outlet port 1504 may be based on the creating of the positive pressure.

Figure 16:
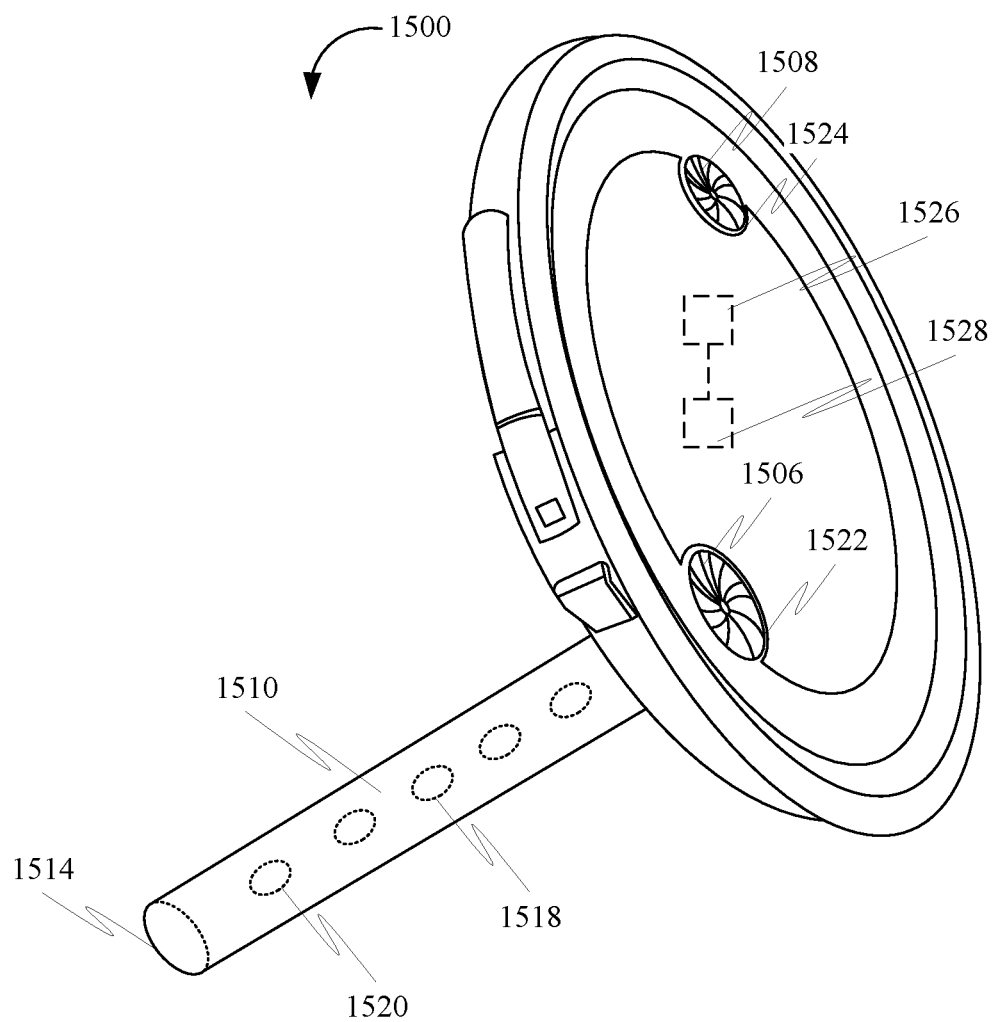
FIG. 16 is a perspective view of the barrel lid, in accordance with some embodiments.

FIG. 16 is a perspective view of the barrel lid 1500, in accordance with some embodiments. Further, FIG. 16 is an assembled view of the barrel lid 1500.

Figure 17:
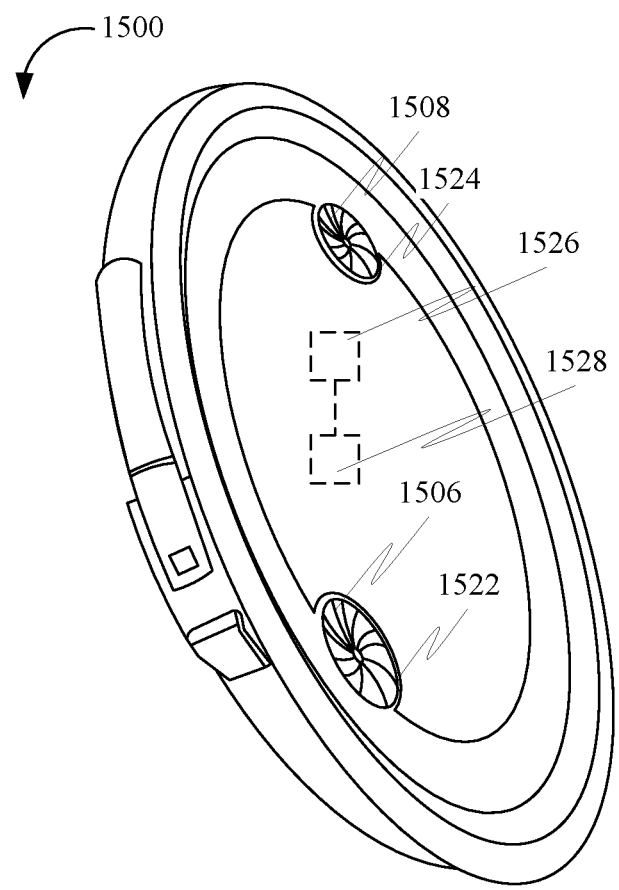
FIG. 17 is a perspective view of the barrel lid without the at least one duct, in accordance with some embodiments.

FIG. 17 is a perspective view of the barrel lid 1500 without the at least one duct 1510, in accordance with some embodiments.

Further disclosed herein is an apparatus for facilitating ventilating a barrel, in accordance with some embodiments. Further, the apparatus may include the barrel, a barrel lid, at least two pumps, at least one duct, and at least two valves.

Further, the barrel may include an interior space and an opening leading into the interior space. Further, the barrel may be configured for storing at least one organic material in the interior space. Further, the at least one organic material may include herbs, spices, botanical material, cannabis/hemp, etc.

Further, the barrel lid may be configured to be coupled with the opening of the barrel. Further, the barrel lid may be configured to be removably coupled with the opening of the barrel. Further, the barrel lid may be at least two ports disposed on the barrel lid. Further, the at least two ports lead into the interior space from an exterior space outside the barrel.

Further, the at least two pumps may be coupled to the barrel lid. Further, the at least two pumps may include an inlet pump attached to an inlet port of the at least two ports and an outlet pump attached to an outlet port of the at least two ports. Further, the inlet pump may be configured for drawing external air into the interior space from the exterior space through the inlet port. Further, the outlet pump may be configured for expelling internal air from the interior space into the exterior space through the outlet port.

Further, the at least one duct may be coupled with the barrel lid. Further, the at least one duct may be configured to be disposed in the interior space of the barrel. Further, the at least one duct extends along a barrel length of the barrel. Further, the at least one duct may include a plurality of openings disposed along a length of the at least one duct from a top end of the at least one duct to a bottom end of the at least one duct. Further, the top end of the at least one duct may be fluidly coupled with the inlet port. Further, the plurality of openings of the at least one duct may be configured for creating a plurality of airflows in the interior space along the barrel length of the barrel for ventilating the interior space based on the drawing of the external air through the inlet port and the expelling of the internal air through the outlet port.

Further, the at least two valves may be attached to the at least two ports. Further, the at least two valves may be configured for transitioning between an open state and a closed state for openably closing the at least two ports. Further, the at least two valves may be configured for opening the at least two ports based on the transitioning of the at least two valves from the closed state to the open state. Further, the opening of the at least two ports unseals the barrel. Further, the drawing of the external air through the inlet port and the expelling of the internal air through the outlet port may be based on the opening of the at least two ports.

Figure 18:
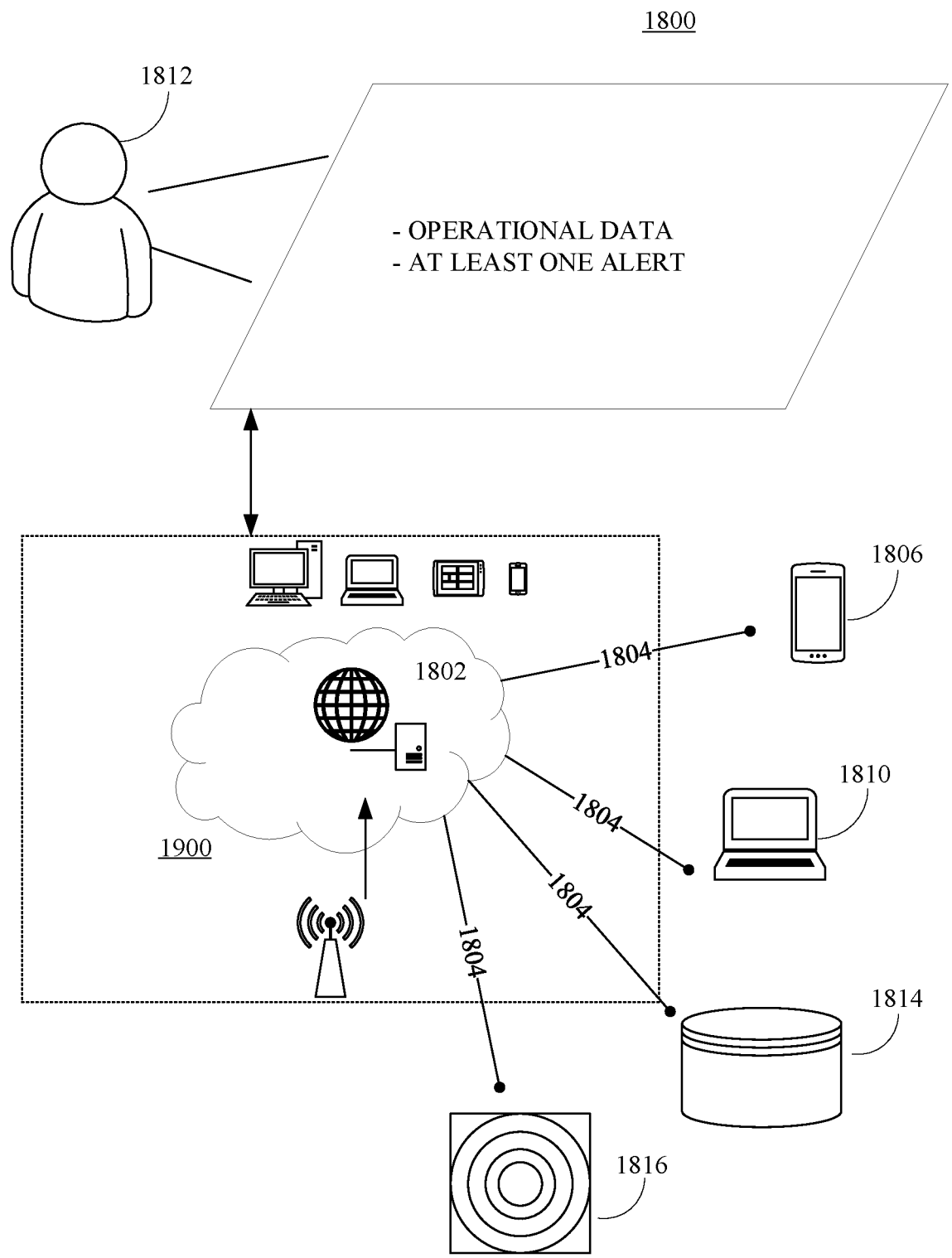
FIG. 18 is an illustration of an online platform consistent with various embodiments of the present disclosure.

FIG. 18 is an illustration of an online platform 1800 consistent with various embodiments of the present disclosure. By way of non-limiting example, the online platform 1800 to facilitate ventilating of a barrel using a barrel lid may be hosted on a centralized server 1802, such as, for example, a cloud computing service. The centralized server 1802 may communicate with other network entities, such as, for example, a mobile device 1806 (such as a smartphone, a laptop, a tablet computer, etc.), other electronic devices 1810 (such as desktop computers, server computers, etc.), databases 1814, and sensors 1816 over a communication network 1804, such as, but not limited to, the Internet. Further, users of the online platform 1800 may include relevant parties such as, but not limited to, end-users, administrators, service providers, service consumers, and so on. Accordingly, in some instances, electronic devices operated by the one or more relevant parties may be in communication with the platform.

A user 1812, such as the one or more relevant parties, may access online platform 1800 through a web based software application or browser. The web based software application may be embodied as, for example, but not be limited to, a website, a web application, a desktop application, and a mobile application compatible with a computing device 1900.

Figure 19:
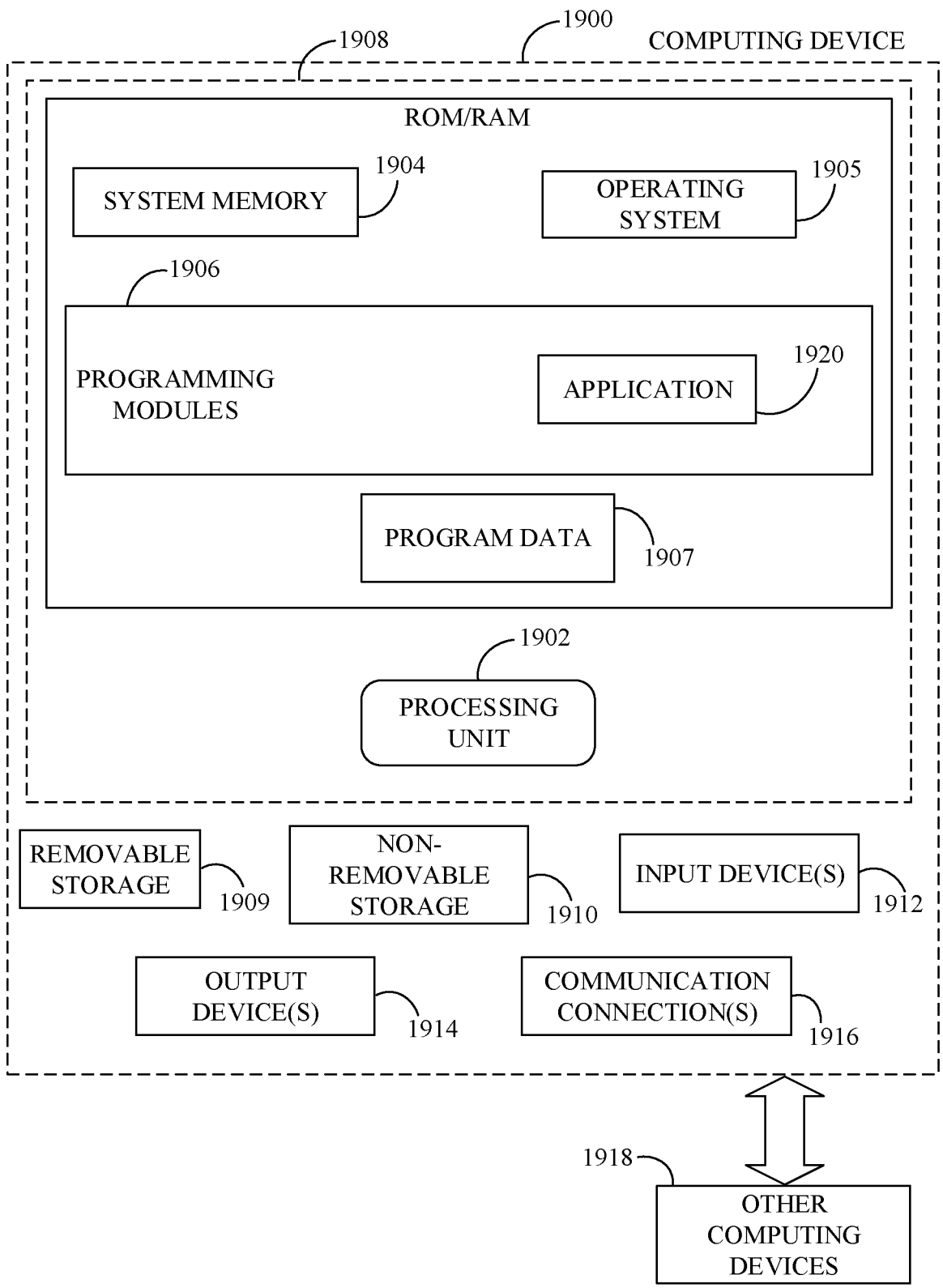
FIG. 19 is a block diagram of a computing device for implementing the methods disclosed herein, in accordance with some embodiments.

With reference to FIG. 19, a system consistent with an embodiment of the disclosure may include a computing device or cloud service, such as computing device 1900. In a basic configuration, computing device 1900 may include at least one processing unit 1902 and a system memory 1904. Depending on the configuration and type of computing device, system memory 1904 may comprise, but is not limited to, volatile (e.g. random-access memory (RAM)), non-volatile (e.g. read-only memory (ROM)), flash memory, or any combination. System memory 1904 may include operating system 1905, one or more programming modules 1906, and may include a program data 1907. Operating system 1905, for example, may be suitable for controlling computing device 1900's operation. In one embodiment, programming modules 1906 may include image-processing module, machine learning module. Furthermore, embodiments of the disclosure may be practiced in conjunction with a graphics library, other operating systems, or any other application program and is not limited to any particular application or system. This basic configuration is illustrated in FIG. 19 by those components within a dashed line 1908.

Computing device 1900 may have additional features or functionality. For example, computing device 1900 may also include additional data storage devices (removable and/or non-removable) such as, for example, magnetic disks, optical disks, or tape. Such additional storage is illustrated in FIG. 19 by a removable storage 1909 and a non-removable storage 1910. Computer storage media may include volatile and non-volatile, removable and non-removable media implemented in any method or technology for storage of information, such as computer-readable instructions, data structures, program modules, or other data. System memory 1904, removable storage 1909, and non-removable storage 1910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1900. Any such computer storage media may be part of device 1900. Computing device 1900 may also have input device(s) 1912 such as a keyboard, a mouse, a pen, a sound input device, a touch input device, a location sensor, a camera, a biometric sensor, etc. Output device(s) 1914 such as a display, speakers, a printer, etc. may also be included. The aforementioned devices are examples and others may be used.

Computing device 1900 may also contain a communication connection 1916 that may allow device 1900 to communicate with other computing devices 1918, such as over a network in a distributed computing environment, for example, an intranet or the Internet. Communication connection 1916 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1904, including operating system 1905. While executing on processing unit 1902, programming modules 1906 may perform processes including, for example, one or more stages of methods, algorithms, systems, applications, servers, databases as described above. The aforementioned process is an example, and processing unit 1902 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Supplemental Description

The adapter pieces used to attach the breather tube to the ¾" female threads of the barrel. The male threaded piece goes in longer than the usual bung would so that the female threaded piece can screw into the male threaded piece. The male threaded piece has a check valve attached to it. A debris guard with bigger holes is attached just above the check valve with a fine screen between the two, which protects the check valve from small particles. The male threaded piece has an area for a gasket, and the female thread piece has a channel for an O-ring so that the system seals from both pieces, on the inside and outside. The gaskets that come with the barrels are meant to be used with the system for now, but other seals could be used later too.

In order to simplify shipping logistics (using smaller shipping boxes), the breather tube is most likely assembled by the user from two separate pieces, and a piece of coupling (i.e., polyvinyl chloride (PVC) coupling and threaded coupling) would attach the two pipe pieces together to create a single, longer pipe. The part of the pipe that would be attached to the barrel lid (top) would most likely be a completely sealed pipe, or with very little ventilation holes.

The bottom piece would be the main breather part of the tube, where air would be encouraged to flow from the bottom, creating a more consistent air flow throughout the barrel as mentioned before. The holes would still be very small though, or with thin cuts. Either way, in regard to a perforated PVC pipe, the openings for the air to flow would be small enough to restrict small debris at this end as well. The valves are also able to seal by themselves once the fan turns off. The check valves are normally closed, so it would be unnecessary for the fan(s) to turn in reverse to seal the valves again.

FIG. 11 should show extra sensors, which includes a humidity sensor and a temperature sensor outside the barrel and includes a humidity sensor and a temperature sensor inside the barrel. Further, an air speed sensor and a volatile organic compound (VOC) sensor may be inside the barrel. The user may be aware of the air volume flowing through the system at any time and be able to view a log of the historical data for each sensor.

Terpenes gives cannabis and essentially every plant on earth it's aroma. Therefore, high terpene content in the cannabis plant is desired because it adds to the products smell/quality/price. The better smell that a product has, the more inherent value it has. Terpenes fall under a larger umbrella of compounds known as volatile organic compounds. This is why adding the VOC sensor is important to the design. It is also one of the biggest data points to analyze when attempting to achieve the "optimal cure" with the highest possible terpene content in the product.

Thus, in accordance to the previous paragraph, a slight variation to the flow chart in FIG. 12 should further explained here. Right before 1222, there should be two separate options. The system would cease to vent depending on two different criteria. The simple option would be for the user to set the system on a time schedule. So if the user wants it to cure for 1 month, that would be one way for the system to stop venting. The other option would be based on the data coming from the VOC sensor, which can be implemented with the use of deep learning or another technique of artificial intelligence (AI). The system would not necessarily need AI for this part, as a good algorithm may work fine. However, since small nuances in a system can drastically effect results down the line, an AI program here may prove to be superior to a traditional program.

Further, right before "Turning the Fans 'ON'", there should be something similar to having three options as to how the fan would be turned on in the first place. The first option would be if the user turns on the fan through the "Manual Mode". The second option would have the fan turn on/off according to a set schedule programmed by the user. The third option would be dependent on the values coming from the humidity sensor because the value of relative humidity inversely changes with temperature and consequently would not be used. A different value such as specific or absolute humidity would be used instead in order to maintain the systems accuracy.

The system as shown in FIG. 14 may still be used, but the system may instead use a sensor which is directly wired to the main brain of the system, so that the batteries would not need to be replaced. The system may be wireless or wired, but a wired configuration should be mentioned in reference to FIG. 14.

Although the present disclosure has been explained in relation to its preferred embodiment, it is to be understood that many other possible modifications and variations can be made without departing from the spirit and scope of the disclosure.

What is claimed is:

1. A barrel lid for facilitating ventilating of a barrel, wherein the barrel lid is configured to be coupled with an opening of the barrel, wherein the barrel comprises an interior space, wherein the barrel lid comprises at least two ports disposed on the barrel lid, wherein the at least two ports lead into the interior space from an exterior space outside of the barrel, wherein the barrel lid comprises:
  at least two pumps attached to the at least two ports, wherein the at least two pumps comprises an inlet pump attached to an inlet port of the at least two ports and an outlet pump attached to an outlet port of the at least two ports, wherein the inlet pump is configured for drawing external air into the interior space from the exterior space through the inlet port, wherein the outlet pump is configured for expelling internal air from the interior space into the exterior space through the outlet port;
  at least one duct coupled with the inlet port, wherein the at least one duct is configured to be disposed in the interior space of the barrel, wherein the at least one duct extends along a barrel length of the barrel, wherein the at least one duct comprises a plurality of openings disposed along a length of the at least one duct from a top end of the at least one duct to a bottom end of the at least one duct, wherein the top end of the at least one duct is fluidly coupled with the inlet port, wherein the plurality of openings of the at least one duct is configured for creating a plurality of airflows in the interior space along the barrel length of the barrel for ventilating the interior space based on the drawing of the external air through the inlet port and the expelling of the internal air through the outlet port; and
  at least two valves attached to the at least two ports, wherein the at least two valves are configured for transitioning between an open state and a closed state for openably closing the at least two ports, wherein the at least two valves are configured for opening the at least two ports based on the transitioning of the at least two valves from the closed state to the open state, wherein the opening of the at least two ports unseals the barrel, wherein the drawing of the external air through the inlet port and the expelling of the internal air through the outlet port is based on the opening of the at least two ports;
  wherein the plurality of openings is associated with a number of openings, wherein the number of openings increases along the length of the at least one duct, wherein the plurality of airflows comprises a plurality of even airflows, wherein the creating of the plurality of even airflows in the interior space is based on the number of openings;
  wherein the inlet pump is further configured for creating a negative pressure in the inlet port, wherein the negative pressure is lower than an atmospheric pressure associated with the exterior space, wherein the drawing of the external air through the inlet port is based on the creating of the negative pressure, wherein the outlet pump is further configured for creating a positive pressure in the outlet port, wherein the positive pressure is greater than the atmospheric pressure, wherein the expelling of the internal air through the outlet port is based on the creating of the positive pressure;
  wherein the at least two valves comprises an inlet valve associated with the inlet pump and an outlet valve associated with the outlet pump, wherein the inlet pump is further configured for applying the negative pressure to the inlet valve based on the creating of the negative pressure, wherein the inlet valve transitions from the closed state to the open state based on the applying of the negative pressure for opening the inlet port, wherein the drawing of the external air through the inlet port is further based on the opening of the inlet port;

wherein the outlet pump is further configured for applying the positive pressure to the outlet port based on the creating of the positive pressure, wherein the outlet valve transitions from the closed state to the open state based on the applying of the positive pressure for opening the outlet port, wherein the expelling of the internal air through the outlet port is further based on the opening of the outlet port.

* * * * *